(12) United States Patent
Liu

(10) Patent No.: US 12,390,863 B2
(45) Date of Patent: Aug. 19, 2025

(54) CLUTCH DEVICE, DRILL CHUCK, POWER TOOL, AND BIDIRECTIONAL ROTATION METHOD OF DRILL CHUCK

(71) Applicant: Yaoting Liu, Weihai (CN)

(72) Inventor: Yaoting Liu, Weihai (CN)

(73) Assignee: Yaoting Liu, Weihai (CN)

( * ) Notice: Subject to any disclaimer, the term of this patent is extended or adjusted under 35 U.S.C. 154(b) by 731 days.

(21) Appl. No.: 17/423,783

(22) PCT Filed: May 27, 2019

(86) PCT No.: PCT/CN2019/088564
§ 371 (c)(1),
(2) Date: Jul. 16, 2021

(87) PCT Pub. No.: WO2020/220420
PCT Pub. Date: Nov. 5, 2020

(65) Prior Publication Data
US 2022/0118528 A1    Apr. 21, 2022

(30) Foreign Application Priority Data

Apr. 28, 2019    (CN) .......................... 201910351537.5

(51) Int. Cl.
*B23B 31/12*    (2006.01)
(52) U.S. Cl.
CPC ........ *B23B 31/123* (2013.01); *B23B 31/1207* (2013.01); *B23B 31/1246* (2013.01);
(Continued)
(58) Field of Classification Search
CPC ............ B23B 31/1253; B23B 31/1246; B23B 31/1207; B23B 31/123; Y10T 279/17641; Y10T 279/32
See application file for complete search history.

(56) References Cited

U.S. PATENT DOCUMENTS

| | | | | |
|---|---|---|---|---|
| 5,407,215 A | * | 4/1995 | Yang | ................... B23B 31/1253 |
| | | | | 279/140 |
| 6,260,856 B1 | * | 7/2001 | Temple-Wilson | .......................... |
| | | | | B23B 31/1238 |
| | | | | 279/140 |

(Continued)

FOREIGN PATENT DOCUMENTS

AT    220912 B    4/1962
CN    102343447    2/2012
(Continued)

OTHER PUBLICATIONS

"Office Action for Canada Patent Application No. 2019088564, dated Oct. 31, 2022".
(Continued)

*Primary Examiner* — Sunil K Singh
*Assistant Examiner* — Eric Daniel Whitmire

(57)    ABSTRACT

Disclosed are a clutch device, a drill chuck, a power tool, and a bidirectional rotation method of the drill chuck. The clutch device comprises a return elastic member, a transmission assembly and a rotating portion, wherein the transmission assembly comprises at least two oppositely arranged engagement portions; the engagement between the two engagement portions enables a front body and a rear body to rotate synchronously; the rotation of the rotating portion in a first direction enables the return elastic member to be compressed, such that the two engagement portions are disconnected; and the rotation of the rotating portion in a second direction enables the compressed return elastic member to return to an initial position such that the two engagement portions are engaged. The drill chuck comprises a front body, a rear body, clamping jaws and the clutch device; and the power tool comprises a driving shaft and the drill chuck.

8 Claims, 24 Drawing Sheets

(52) U.S. Cl.
CPC ... *B23B 31/1253* (2013.01); *Y10T 279/17641* (2015.01); *Y10T 279/32* (2015.01)

(56) References Cited

U.S. PATENT DOCUMENTS

| | | | |
|---|---|---|---|
| 6,572,310 | B2 | 6/2003 | Temple-Wilson |
| 2002/0089127 | A1 | 7/2002 | Rohm |
| 2005/0023776 | A1 | 2/2005 | Yang et al. |
| 2013/0264782 | A1* | 10/2013 | Mason ............... B23B 31/1238 279/61 |
| 2015/0115551 | A1* | 4/2015 | Schenk .............. B23B 31/1253 279/63 |

FOREIGN PATENT DOCUMENTS

| | | |
|---|---|---|
| CN | 104551058 A | 4/2015 |
| CN | 108971536 | 12/2018 |
| CN | 109365849 | 2/2019 |
| CN | 208662858 | 3/2019 |
| CN | 208728703 | 4/2019 |
| CN | 109940200 | 6/2019 |
| CN | 210023858 U | 2/2020 |
| JP | H09234612 | 9/1997 |
| JP | 1997509896 | 10/1997 |
| JP | 11506705 | 6/1999 |
| JP | 2010260122 | 11/2010 |
| JP | 2015080850 | 4/2015 |
| JP | 2018529540 | 10/2018 |
| WO | 2018103177 | 6/2018 |

OTHER PUBLICATIONS

"Office Action for European Patent Application No. 19927249.3, dated Jul. 2, 2022".
"Office Action for India Patent Application No. 202127031708, dated Mar. 24, 2022".
"Office Action for Japan Patent Application No. 2021-548644, dated Sep. 6, 2022".
"Office Action for Korea Patent Application No. 10-2021-7024302, dated Oct. 26, 2022".
"Office Action for Russia Patent Application No. 2021120993/05, dated Mar. 4, 2022".
"Office Action for European Patent Application No. 19927249.3, dated Jul. 27, 2023".
"Office Action for Korea Patent Application No. 10-2021-7024302, dated Apr. 19, 2023".
"European Search Report for 19927249.3, dated Jan. 26, 2022".
"PCT International Search Report and Written Opinion for International Application No. PCT/CN2017/070154, mailing date of Sep. 15, 2017".
PCT International Search Report and Written Opinion for International Application No. PCT/CN2019/088564, Jan. 15, 2020.
Chinese search report for CN2019103515375, mailed Nov. 10, 2023.

* cited by examiner

CLUTCH DEVICE, DRILL CHUCK, POWER TOOL, AND BIDIRECTIONAL ROTATION METHOD OF DRILL CHUCK

CROSS-REFERENCE TO RELATED APPLICATION

The present disclosure claims the priority to the Chinese patent application with the filing number 2019103515375 filed on Apr. 28, 2019 with the Chinese Patent Office, and entitled "Clutch Device, Drill Chuck, Power Tool, and Bidirectional Rotation Method of Drill Chuck", the contents of which are incorporated herein by reference in entirety.

TECHNICAL FIELD

The present disclosure relates to the technical field of drill chucks, in particular to a clutch device, a drill chuck, a power tool, and a bidirectional rotation method of the drill chuck.

BACKGROUND ART

When the self-tightening drill chucks currently on the market suddenly start in a vibration working state or in an idling state, and a rotating direction of the idling is a direction of loosening a drilling tool, the drilling tool tends to get loose, and even the drilling tool is caused to detach from the drill chuck.

SUMMARY

The present disclosure aims at providing a clutch device, a drill chuck, a power tool, and a bidirectional rotation method of the drill chuck, so as to solve the technical problems existing in the prior art that when the self-tightening drill chucks suddenly start in a vibration working state or in an idling state and a rotating direction of the idling is a direction of loosening a drilling tool, the drilling tool tends to get loose and even the drilling tool is caused to detach from the drill chuck.

The present disclosure provides a clutch device, which includes a return elastic member, a transmission assembly, and a rotating portion; the transmission assembly includes at least two oppositely arranged engagement portions, one of the engagement portions can rotate in synchronization with a front body of the drill chuck, and the other one of the engagement portions can rotate in synchronization with a rear body of the drill chuck; engagement between the two engagement portions can enable the front body and the rear body to rotate in synchronization; rotation of the rotating portion in a first direction can enable the return elastic member to be compressed, so as to disengage the two engagement portions from each other; and rotation of the rotating portion in the second direction can enable the compressed return elastic member to return to an initial position, so as to make the two engagement portions engaged with each other.

Optionally, engagement or disengagement between the two engagement portions is realized through a tooth structure, the engagement portions may be of a sheet structure, the tooth structure includes a plurality of teeth provided on a sheet surface of the sheet structure, and the plurality of teeth are distributed in a circular shape on the sheet surface.

Optionally, the clutch device further includes a rear sleeve, the rear sleeve is configured for fixed connection with the rear body, and the connection between the rear sleeve and the rear body may be interference fit or key connection.

Optionally, a trigger is further included, wherein rotation of the rotating portion can enable the trigger to push one of the engagement portions to move, so that the return elastic member can be compressed or return to the initial position.

Optionally, the return elastic member is located outside one of the engagement portions, and inner sides of the two engagement portions are opposite to each other.

Optionally, the number of engagement portions is two, and the two engagement portions are a first engagement portion and a second engagement portion, respectively; the return elastic member is located outside the second engagement portion, and the second engagement portion is located between the return elastic member and the first engagement portion; alternatively, the return elastic member is located outside the first engagement portion, and the first engagement portion is located between the return elastic member and the second engagement portion.

Optionally, when the return elastic member is located outside the second engagement portion, the first engagement portion and the front body are fixedly connected with each other, and the second engagement portion can move along an axial direction of the rear body.

Optionally, the trigger includes a lever; rotation of the rotating portion in the first direction can enable the lever to pry the second engagement portion so as to make the second engagement portion move along the axial direction of the rear body, so that the first engagement portion and the second engagement portion are disengaged from each other.

Optionally, the trigger further includes a connecting rod fixed on the rotating portion, the connecting rod extends along an axial direction of the rotating portion, and the connecting rod is provided with a contact (contact head); the lever includes a first raised portion and a second raised portion connected to the first raised portion, and the first raised portion and the second raised portion are arranged with an angle therebetween.

Optionally, the lever is rotatably mounted in a circumferential direction of the first engagement portion through a pin shaft; the rotating portion is of a sleeve-shaped structure, and an inner surface of the sleeve-shaped structure is provided with a protruding block configured to push the lever to rotate around the pin shaft.

Optionally, the first engagement portion is provided with positioning holes, and the lever includes an insertion portion and a prying portion; a length extending direction of the insertion portion and a length extending direction of the prying portion have an angle therebetween, the insertion portion is inserted into the corresponding positioning hole, the rotating portion is of a sleeve-shaped structure, and an inner surface of the sleeve-shaped structure is provided with the protruding block configured to push the insertion portion to sway in the positioning hole, so as to enable the prying portion to move.

Optionally, when the return elastic member is located outside the first engagement portion, the first engagement portion can move along an axial direction of the front body, and the second engagement portion is fixedly connected to the rear body.

Optionally, the trigger includes a connecting rod fixed on the rotating portion, the connecting rod extends along the axial direction of the rotating portion, and the connecting rod is provided with a contact; a surface of the first engagement portion is provided with a contact socket; and the contact can enter or leave the contact socket along with the rotation of the rotating portion.

Optionally, the trigger includes a follower portion and a connecting rod fixed on the follower portion, the connecting rod extends along an axial direction of the follower portion, and the connecting rod is provided with a contact; the follower portion and the rotating portion are in threaded transmission; a link guide groove is provided in the circumferential direction of the front body for enabling the connecting rod to move along a length extending direction of the link guide groove.

Optionally, the trigger includes a lever; rotation of the rotating portion in the first direction can enable the lever to pry the first engagement portion so as to make the first engagement portion move along the axial direction of the rear body, so that the first engagement portion and the second engagement portion are disengaged from each other.

Optionally, the first engagement portion is provided with positioning holes, and the lever includes an insertion portion and a prying portion; a length extending direction of the insertion portion and a length extending direction of the prying portion are provided with an angle, the insertion portion is inserted into the corresponding positioning hole, the rotating portion is of a sleeve-shaped structure, and an inner surface of the sleeve-shaped structure is provided with the protruding block configured to push the insertion portion to sway in the positioning hole, so as to enable the prying portion to move.

The present disclosure further provides a drill chuck, which includes a front body, a rear body, at least one clamping jaw, and the clutch device; the rear body can rotate relative to the front body, so as to enable the rear body to drive the at least one clamping jaw to move to clamp or loosen a drilling tool mounted on the drill chuck; one of the engagement portions is connected to the front body, and the other one of the engagement portions is connected to the rear body.

The present disclosure further provides a power tool, which includes a driving shaft and the drill chuck; and the driving shaft is connected to the rear body for driving the rear body to rotate.

The present disclosure further provides a bidirectional rotation method of a drill chuck, wherein the drill chuck includes a rear body, a front body, and at least one clamping jaw, the method includes: enabling the rear body to rotate relative to the front body, so that the rear body can drive the at least one clamping jaw to move; providing a clutch device between the rear body and the front body, so as to make the rear body engaged with or disengaged from the front body, wherein the clutch device includes a return elastic member, a transmission assembly, and a rotating portion; the transmission assembly includes at least two oppositely arranged engagement portions, wherein one of the engagement portions can rotate in synchronization with the front body of the drill chuck, and the other one of the engagement portions can rotate in synchronization with the rear body of the drill chuck; engagement between the two engagement portions can enable the front body and the rear body to rotate in synchronization; rotation of the rotating portion in a first direction can enable the return elastic member to be compressed, so as to make the two engagement portions disengaged from each other; and rotation of the rotating portion in the second direction can enable the compressed return elastic member to return to an initial position, so as to make the two engagement portions engaged with each other.

Compared with the prior art, beneficial effects of the present disclosure are as follows.

Regarding the clutch device, the drill chuck, the power tool, and the bidirectional rotation method of the drill chuck provided in the present disclosure, it is convenient to realize engagement or disengagement between the two oppositely arranged engagement portions through a rotating operation of the rotating portion, in this way, when one of the engagement portions is configured to be rotatable in synchronization with the front body of the drill chuck, and the other of the engagement portions is configured to be rotatable in synchronization with the rear body of the drill chuck, the engagement or disengagement between the front body and the rear body can be realized by just rotating the rotating portion, thus when the front body and the rear body are in an engagement state, it is advantageous to ensure the drilling tool on the drill chuck to have mounting stability when the drill chuck suddenly starts in a vibration working state or in an idling state, and avoid the occurrence of loosening or detachment. Besides, through the engagement between the front body and the rear body, the bidirectional rotation of the drill chuck is further realized, so as to drive the drilling tool to perform bidirectional operation, and the drilling tool may be replaced more reliably, easily, simply, and conveniently.

BRIEF DESCRIPTION OF DRAWINGS

In order to more clearly illustrate technical solutions in specific embodiments of the present disclosure or the prior art, accompanying drawings which need to be used for description of the specific embodiments or the prior art will be introduced briefly below. Apparently, the accompanying drawings in the description below merely show some embodiments of the present disclosure, and those ordinarily skilled in the art still could obtain other accompanying drawings in light of these drawings, without paying creative efforts.

REFERENCE SIGNS

Figure 1:
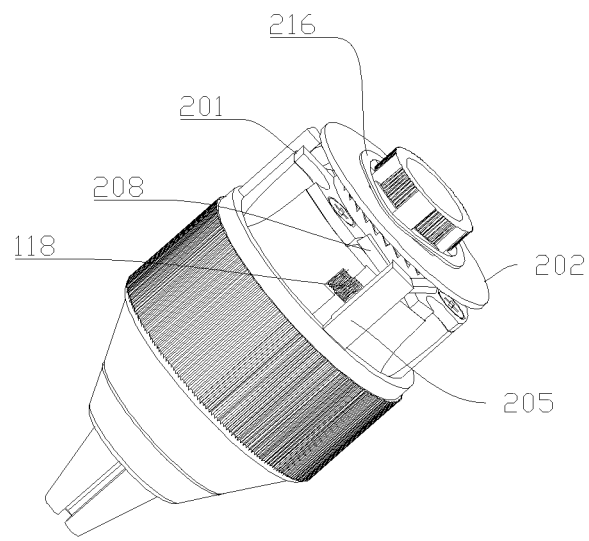
FIG. 1 is an assembled view of a gear self-tightening drill chuck provided in an embodiment of the present disclosure (a rear sleeve is not installed)

100—rear body; 101—front body; 102—clamping jaw; 103—clamping jaw slideway; 105—driven bevel gear; 108—driving bevel gear; 111—screw; 115—front end; 116—rear end; 118—return spring; 121—rear sleeve; 126—end cap; 127—drilling tool receiving hole; 132—inner side surface; 133—strip-shaped groove; 134—positioning key; 201—first engagement portion; 202—second engagement portion; 203—rotating portion; 204—contact; 205—connecting rod; 206—tooth; 208—lever; 209—rotation convex strip; 210—rotation groove; 216—return elastic member; 217—driving portion; 220—first raised portion; 221—second raised portion; 222—accommodating groove; 223—spring groove; 224—shaft shoulder; 225—pin shaft; 226—avoiding groove; 227—pin hole; 228—main body portion; 229—additional portion; 231—protruding block; 232—insertion portion; 233—prying portion; 234—positioning hole; 235—contact socket; 236—first arc surface; 301—disc portion; 302—axial convex portion; 303—internal thread; 304—external thread; 305—fixing sleeve; 306—first arc protrusion; 307—second arc protrusion; 308—triangular structure; 309—sleeve body; 310—follower portion.

DETAILED DESCRIPTION OF EMBODIMENTS

Technical solutions of the present disclosure will be described below clearly and completely in connection with accompanying drawings. Apparently, the embodiments described are only some but not all embodiments of the present disclosure. All of other embodiments obtained by those ordinarily skilled in the art based on the embodiments in the present disclosure without using creative efforts shall fall within the scope of protection of the present disclosure. In the description of the present disclosure, it should be indicated that orientation or positional relations indicated by terms "center", "upper", "lower", "left", "right", "vertical", "horizontal", "inner", "outer" and so on are based on orientation or positional relations as shown in the accompanying drawings, merely for facilitating the description of the present disclosure and simplifying the description, rather than indicating or implying that related devices or elements have to be in the specific orientation or configured and operated in a specific orientation, therefore, they should not be construed as limiting the present disclosure. Besides, terms "first", "second", and "third" are merely for descriptive purpose, but should not be construed as indicating or implying importance in the relativity. In the description of the present disclosure, it should be indicated that unless otherwise specified and defined explicitly, terms "mount", "link", "connect" should be construed in a broad sense. For example, it may be fixed connection, detachable connection, or integral connection; it may be mechanical connection; it may be direct linking, indirect linking via an intermediate medium, or inner communication between two elements. For those ordinarily skilled in the art, specific meanings of the above-mentioned terms in the present disclosure could be understood according to specific circumstances.

Figure 2:
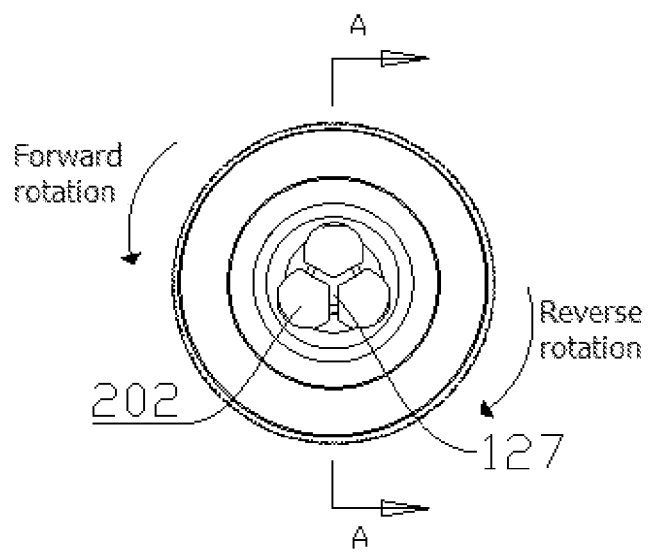
FIG. 2 is a structural schematic view of the gear self-tightening drill chuck in FIG. 1 from another perspective.
Figure 3:
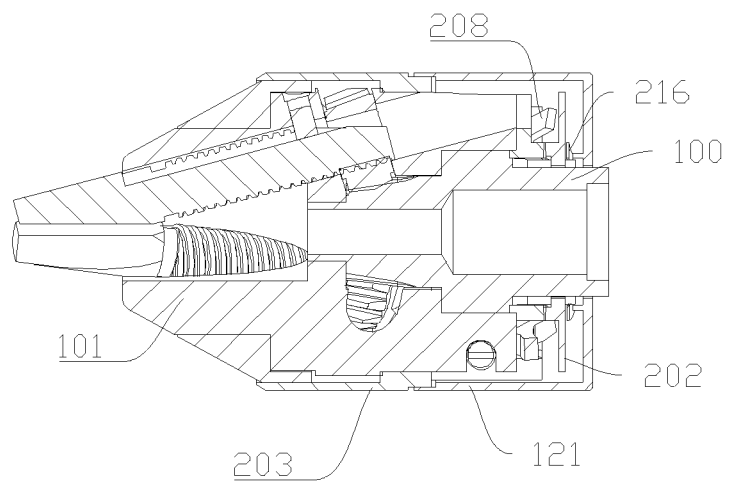
FIG. 3 is a sectional view along a line A-A in FIG. 2.
Figure 4:
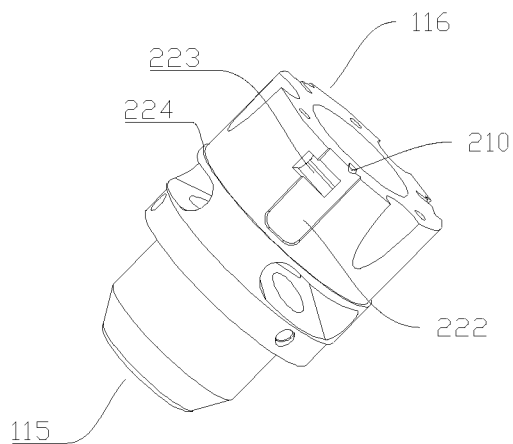
FIG. 4 is a structural schematic view of a front body of the gear self-tightening drill chuck in FIG. 1.
Figure 5:
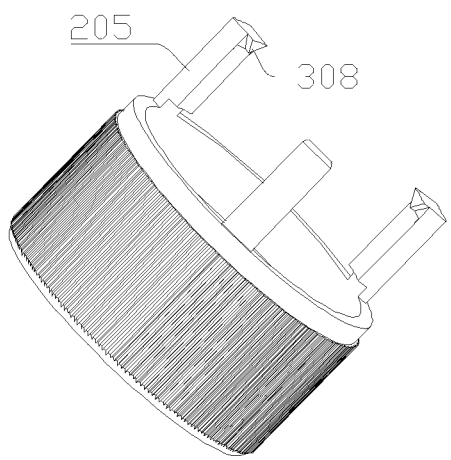
FIG. 5 is a structural schematic view of a rotating portion of a clutch device in FIG. 1.
Figure 6:
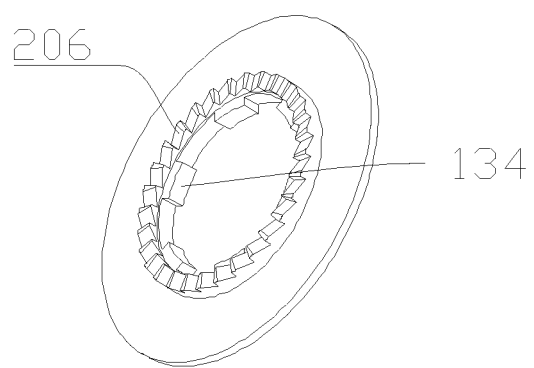
FIG. 6 is a structural schematic view of a second engagement portion of the clutch device in FIG. 1.
Figure 7:
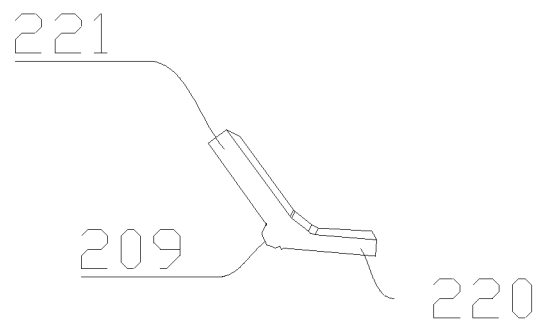
FIG. 7 is a structural schematic view of a lever of the clutch device in FIG. 1.
Figure 8:
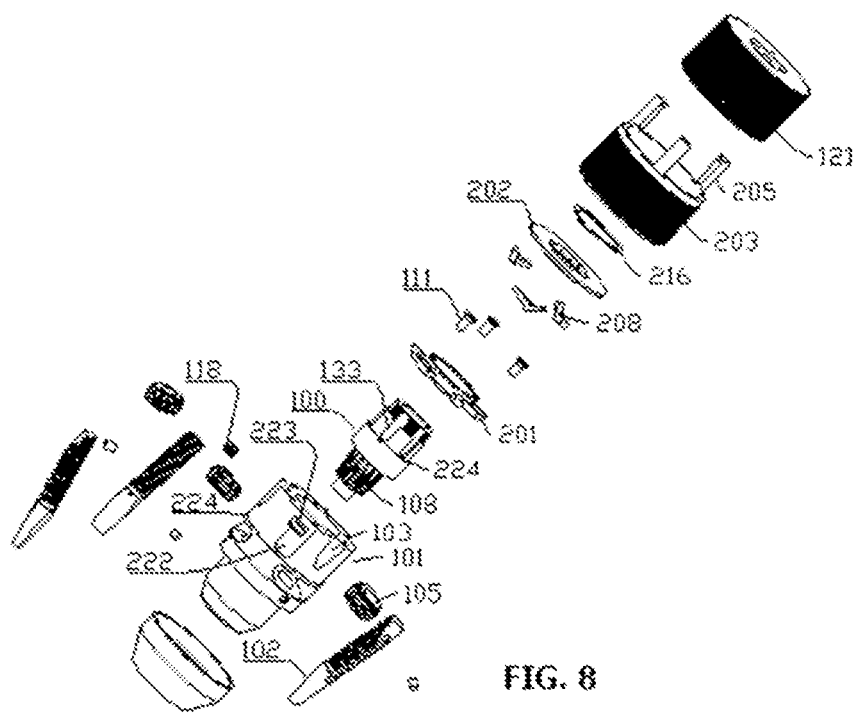
FIG. 8 is an explosive view of the gear self-tightening drill chuck provided in an embodiment of the present disclosure.
Figure 9:
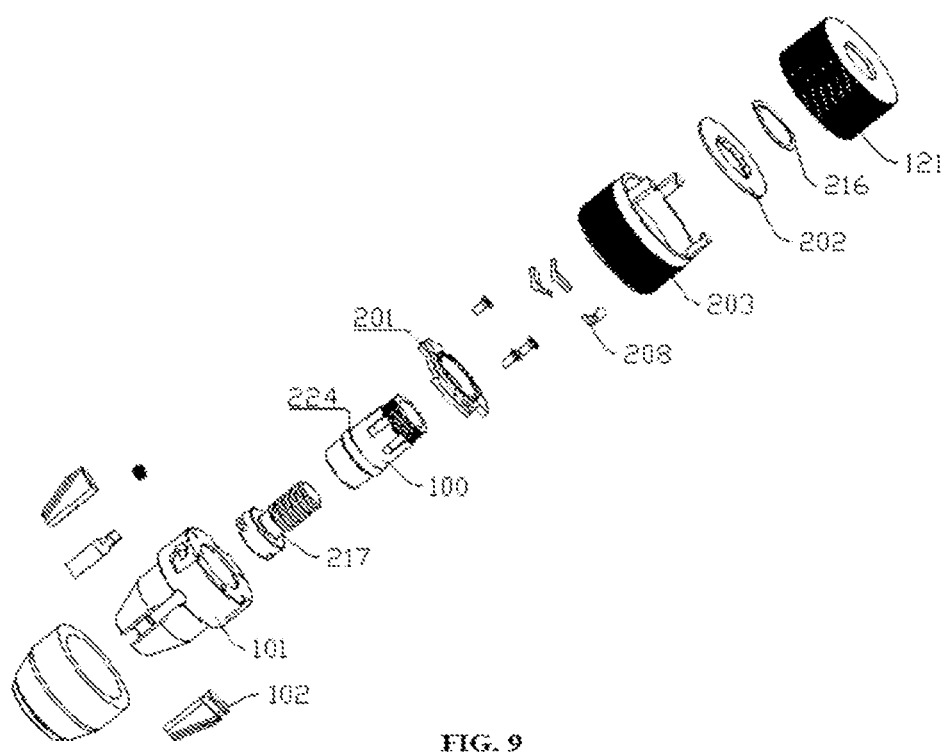
FIG. 9 is an explosive view of a flat jaw self-tightening drill chuck provided in an embodiment of the present disclosure.
Figure 10:
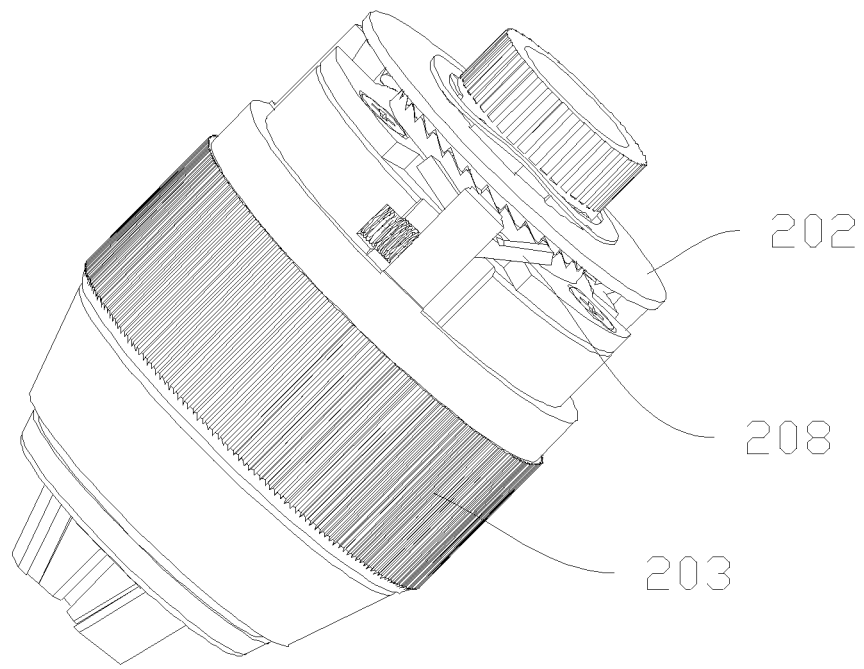
FIG. 10 is an assembled view of the flat jaw self-tightening drill chuck provided in an embodiment of the present disclosure (a rear sleeve is not installed)
Figure 11:
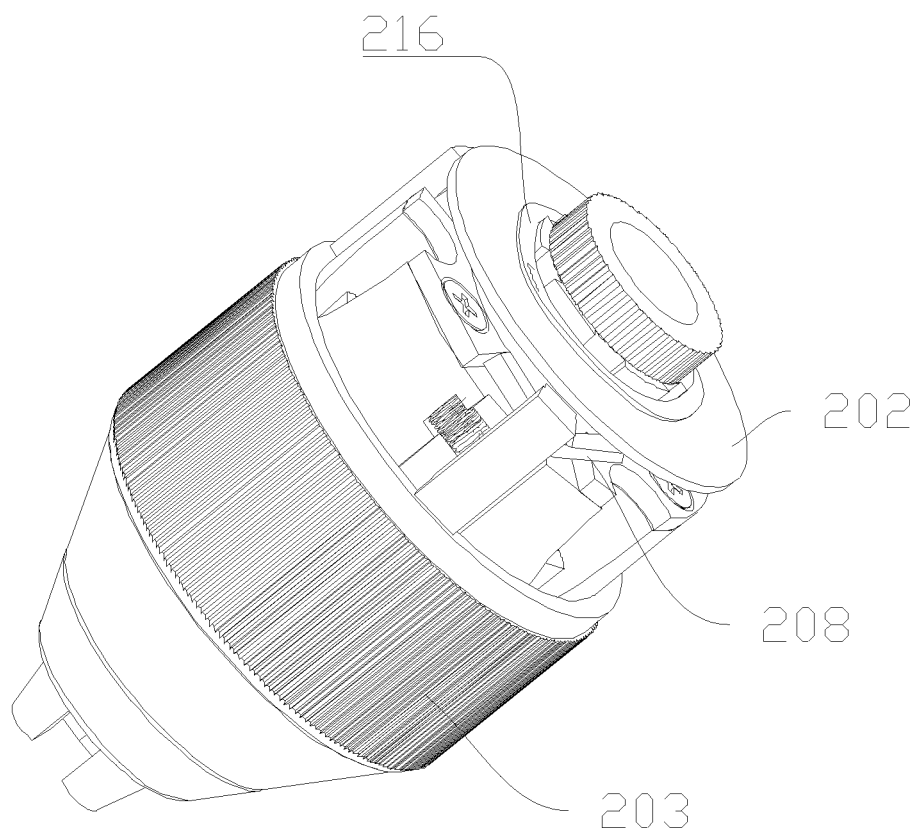
FIG. 11 is an assembled view of an internal thread self-tightening drill chuck provided in an embodiment of the present disclosure (a rear sleeve is not installed)
Figure 12:
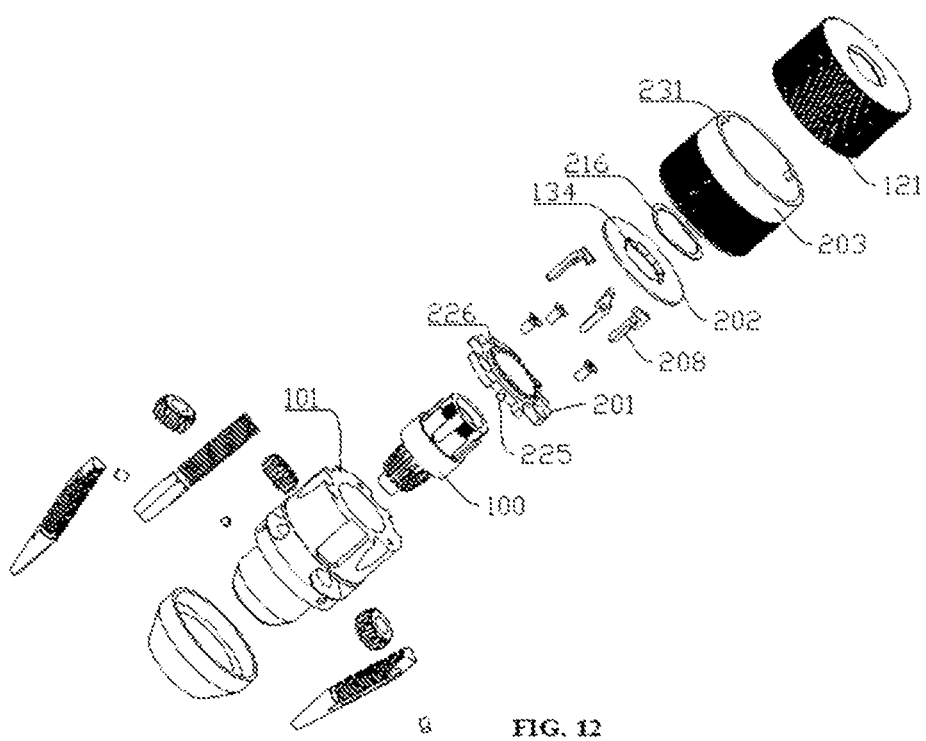
FIG. 12 is an explosive view of the gear self-tightening drill chuck provided in an embodiment of the present disclosure.
Figure 13:
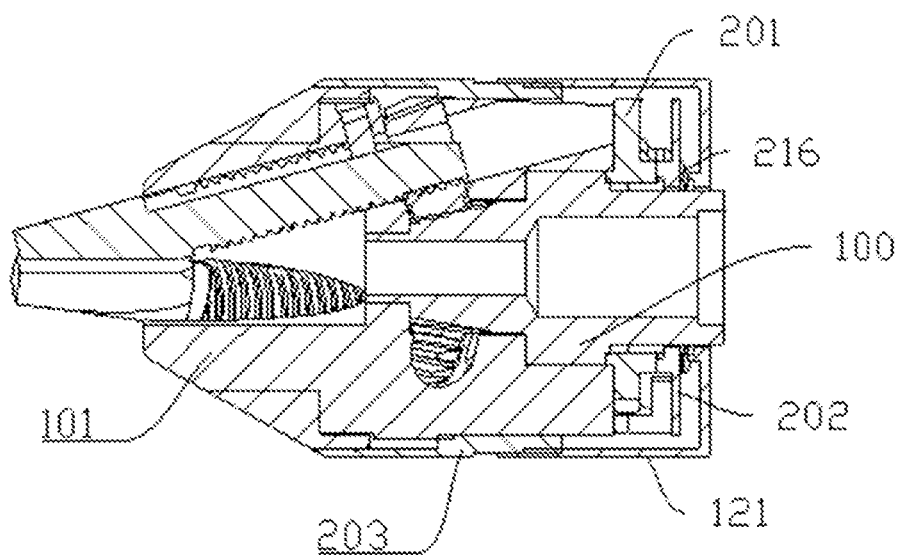
FIG. 13 is a sectional view of the gear self-tightening drill chuck provided in an embodiment of the present disclosure.
Figure 14:
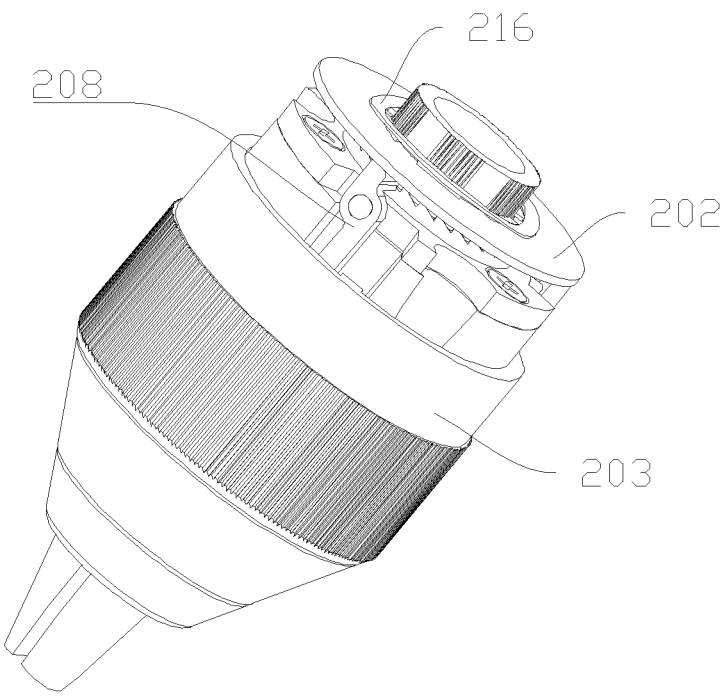
FIG. 14 is an assembled view of the gear self-tightening drill chuck provided in an embodiment of the present disclosure (a rear sleeve is not installed)
Figure 15:
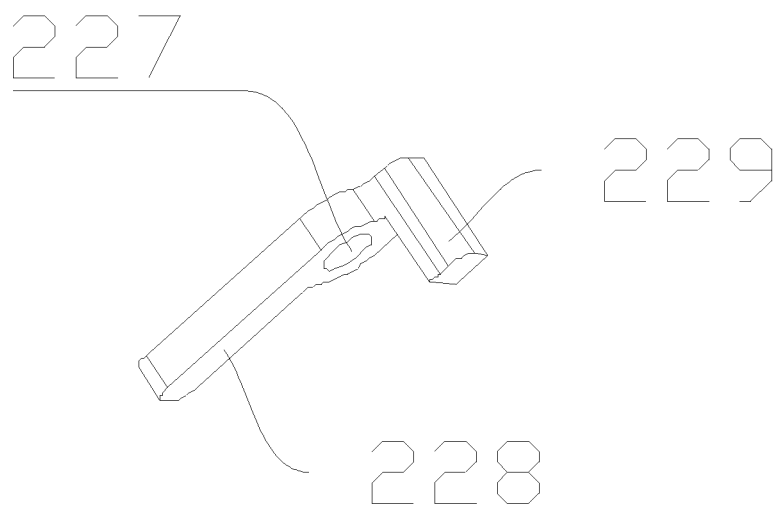
FIG. 15 is a structural schematic view of a lever of the clutch device in FIG. 12.
Figure 16:
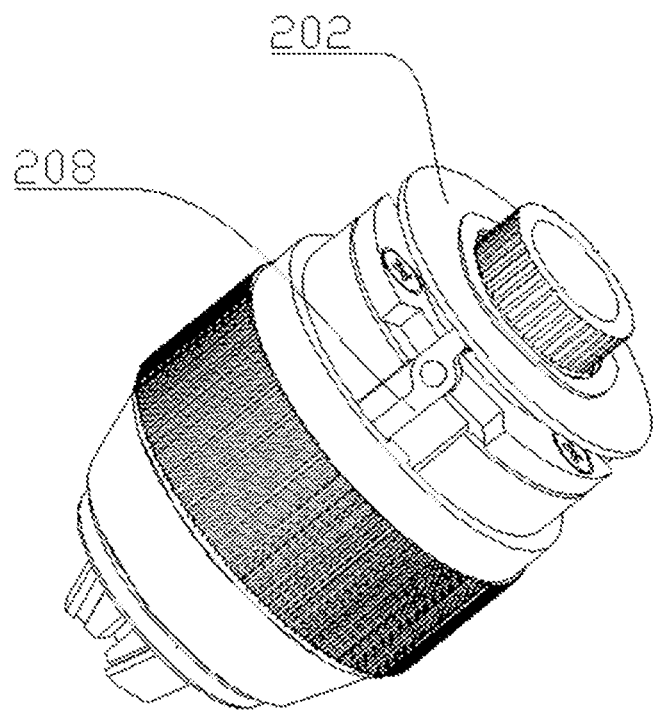
FIG. 16 is an assembled view of the flat jaw self-tightening drill chuck provided in an embodiment of the present disclosure (a rear sleeve is not installed)
Figure 17:
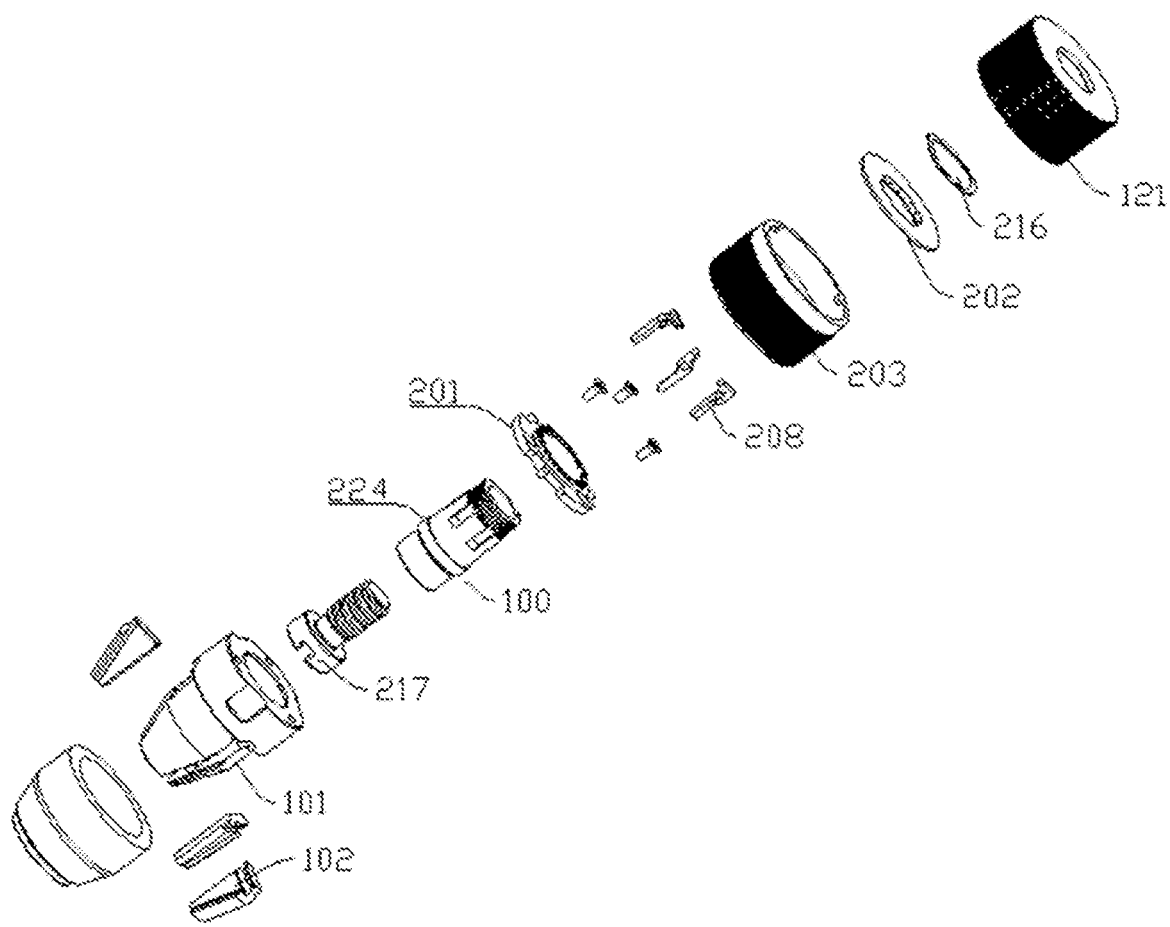
FIG. 17 is an explosive view of the flat jaw self-tightening drill chuck provided in an embodiment of the present disclosure.
Figure 18:
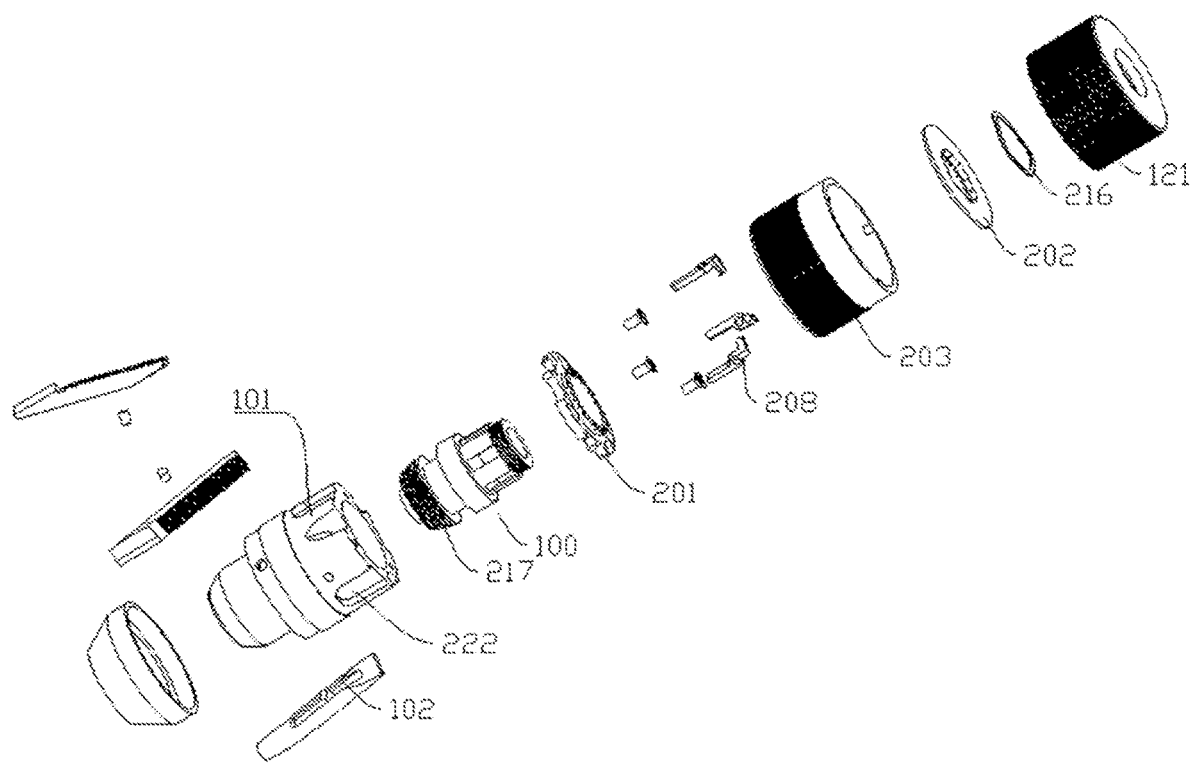
FIG. 18 is an explosive view of the internal thread self-tightening drill chuck provided in an embodiment of the present disclosure.
Figure 19:
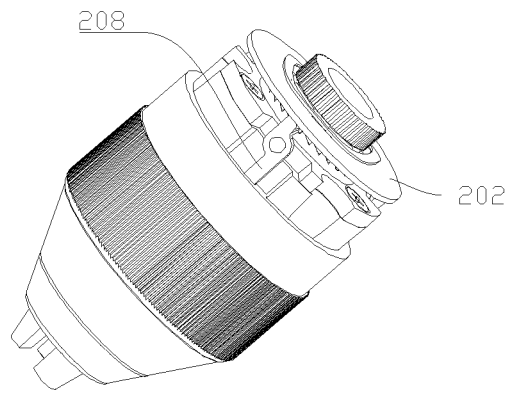
FIG. 19 is an assembled view of the internal thread self-tightening drill chuck provided in an embodiment of the present disclosure (a rear sleeve is not installed)
Figure 20:
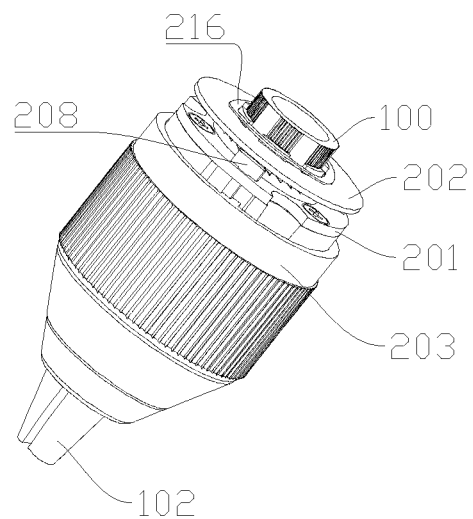
FIG. 20 is an assembled view of the gear self-tightening drill chuck provided in an embodiment of the present disclosure (a rear sleeve is not installed)
Figure 21:
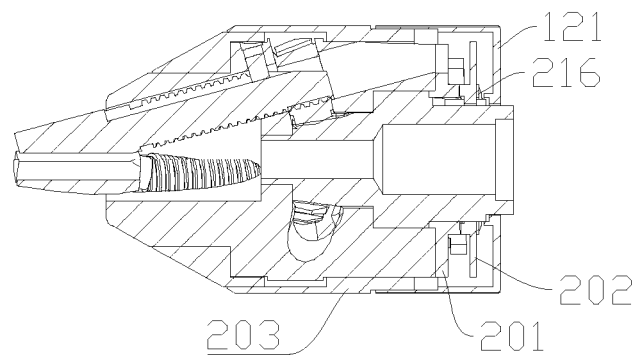
FIG. 21 is a sectional view of the gear self-tightening drill chuck provided in an embodiment of the present disclosure.
Figure 22:
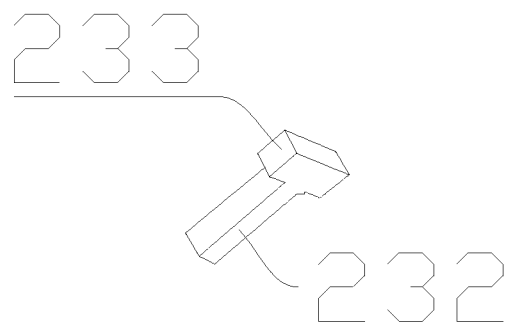
FIG. 22 is a structural schematic view of the lever of the clutch device in FIG. 20.
Figure 23:
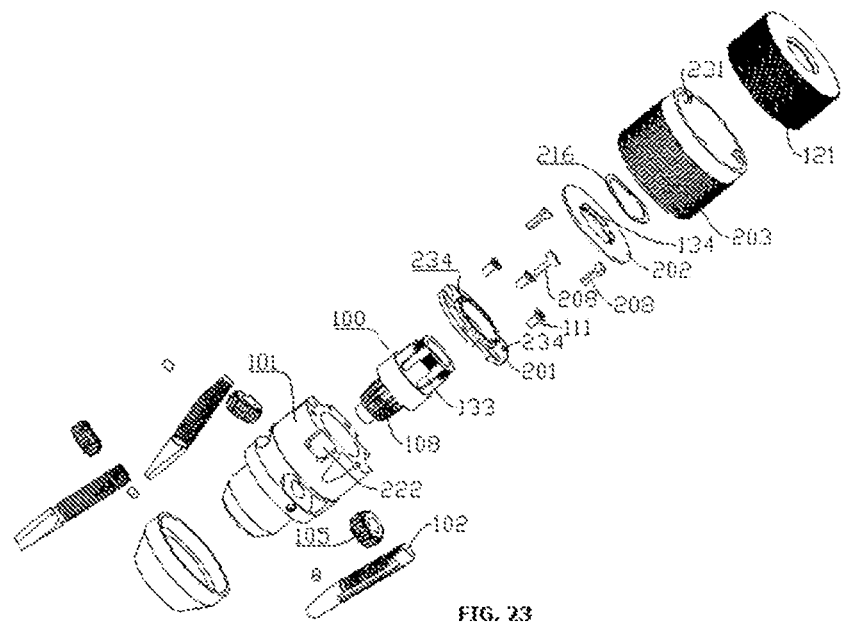
FIG. 23 is an explosive view of the gear self-tightening drill chuck provided in an embodiment of the present disclosure.
Figure 24:
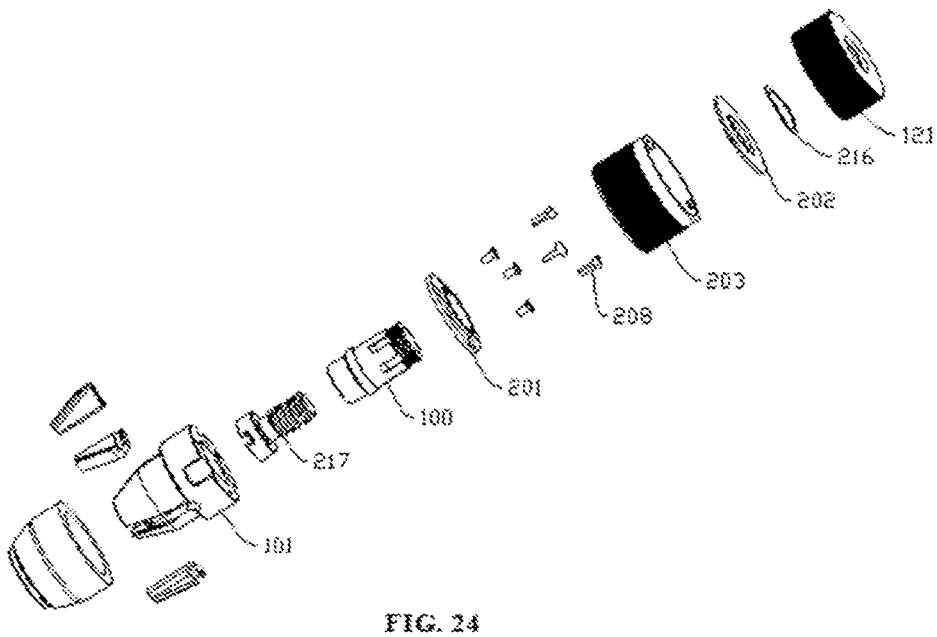
FIG. 24 is an explosive view of the flat jaw self-tightening drill chuck provided in an embodiment of the present disclosure.
Figure 25:
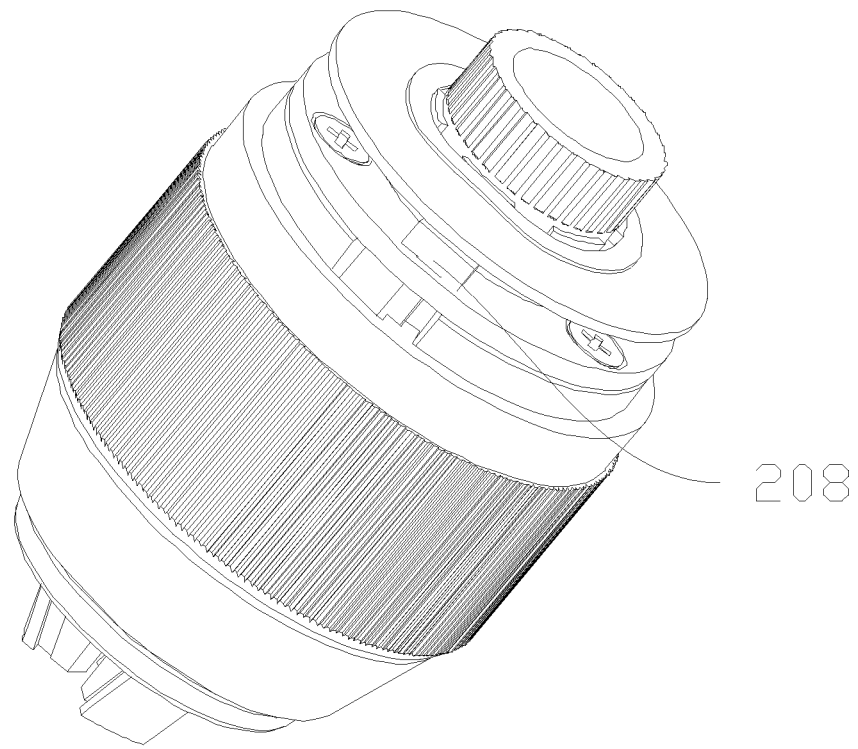
FIG. 25 is an assembled view of the flat jaw self-tightening drill chuck provided in an embodiment of the present disclosure (a rear sleeve is not installed)
Figure 26:
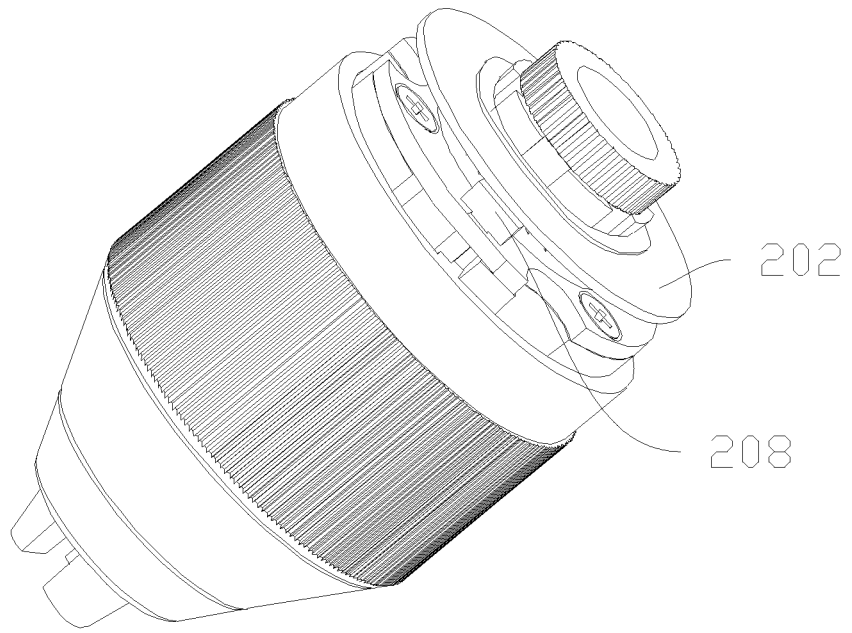
FIG. 26 is an assembled view of the internal thread self-tightening drill chuck provided in an embodiment of the present disclosure (a rear sleeve is not installed)
Figure 27:
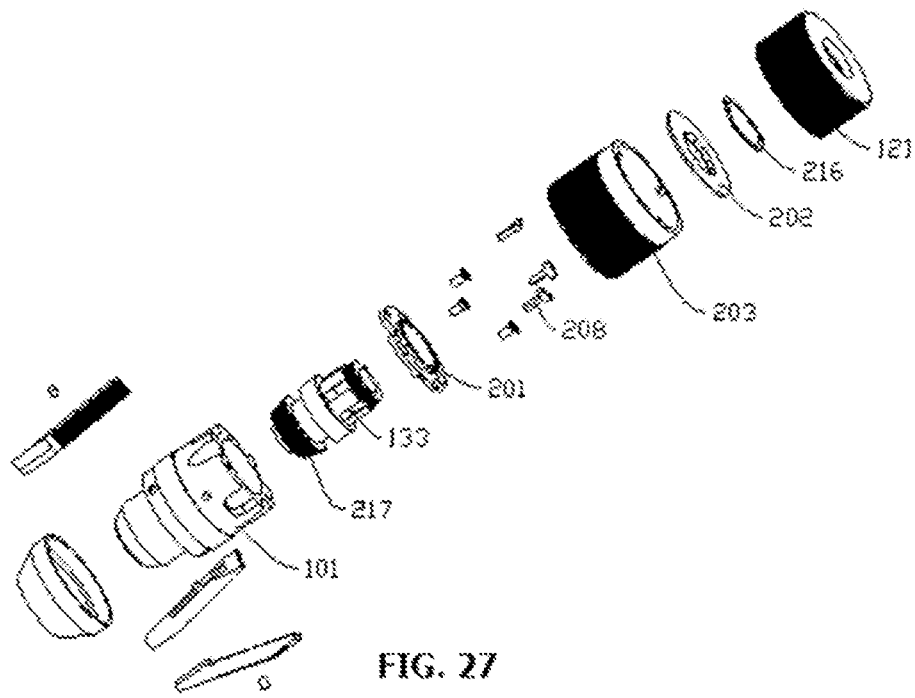
FIG. 27 is an explosive view of the internal thread self-tightening drill chuck provided in an embodiment of the present disclosure.
Figure 28:
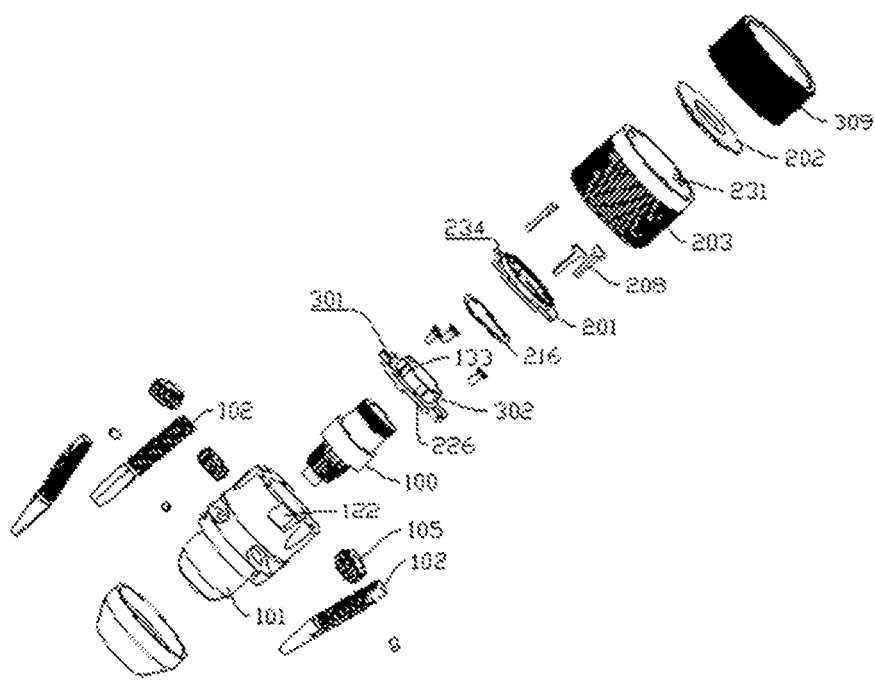
FIG. 28 is an explosive view of the gear self-tightening drill chuck provided in an embodiment of the present disclosure.
Figure 29:
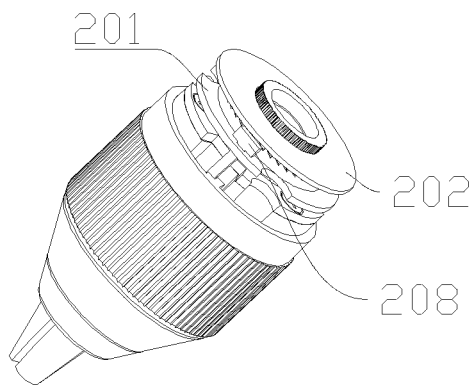
FIG. 29 is an assembled view of the gear self-tightening drill chuck provided in an embodiment of the present disclosure (a sleeve body is not installed)
Figure 30:
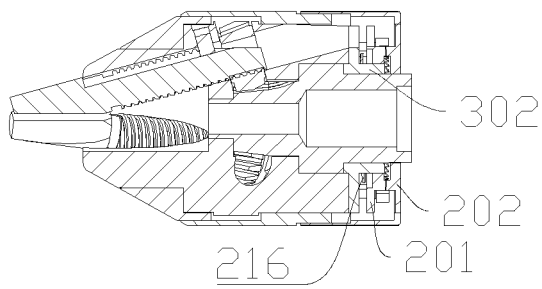
FIG. 30 is a sectional view of the gear self-tightening drill chuck provided in an embodiment of the present disclosure.
Figure 32:
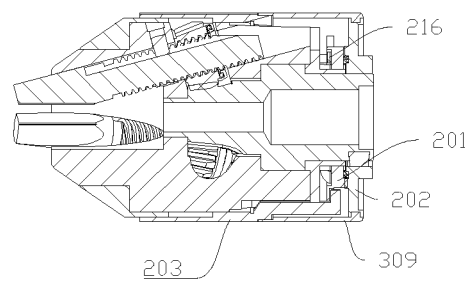
FIG. 32 is a sectional view of the gear self-tightening drill chuck provided in an embodiment of the present disclosure.
Figure 31:
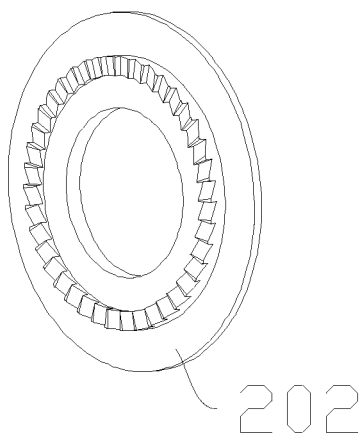
FIG. 31 is a structural schematic view of a second engagement portion of the clutch device in FIG. 28.
Figure 33:
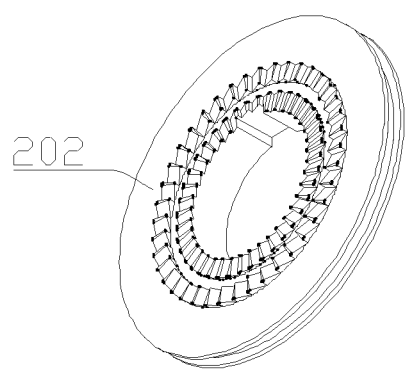
FIG. 33 is a structural schematic view of a second engagement portion of the clutch device in FIG. 33.
Figure 34:
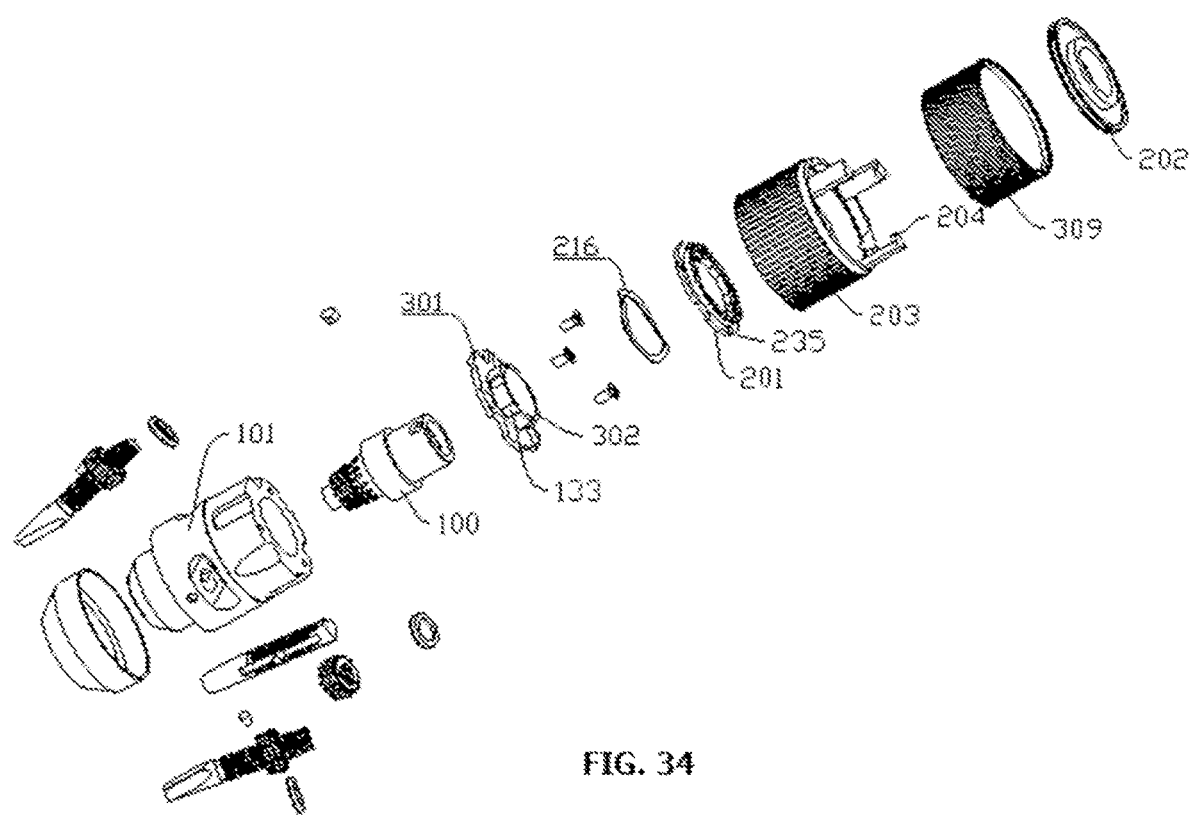
FIG. 34 is an explosive view of the gear self-tightening drill chuck provided in an embodiment of the present disclosure.
Figure 35:
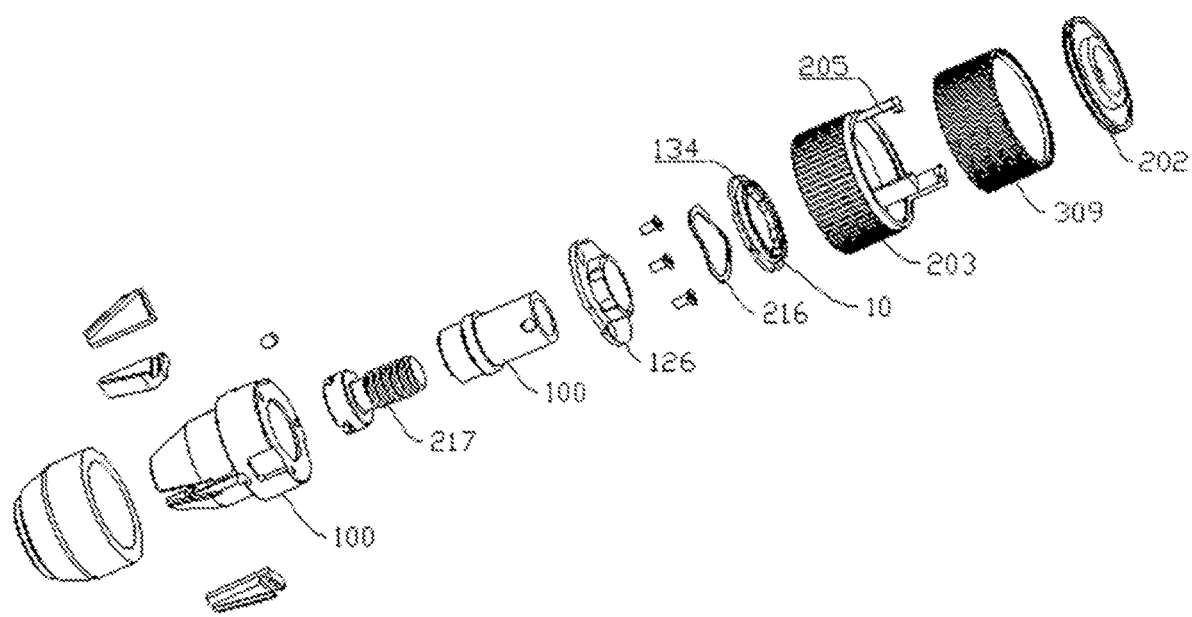
FIG. 35 is an explosive view of the flat jaw self-tightening drill chuck provided in an embodiment of the present disclosure.
Figure 36:
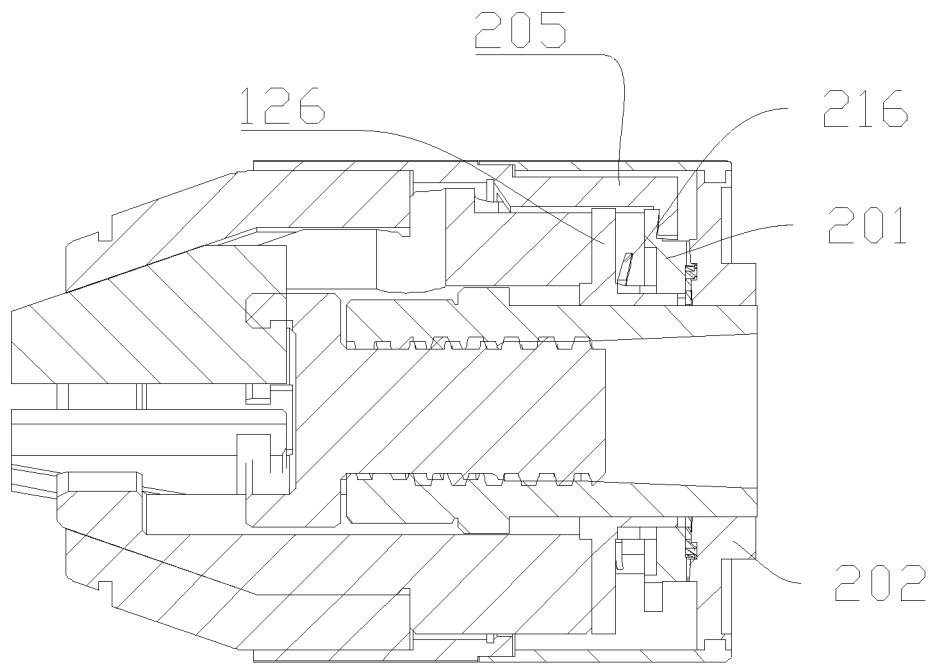
FIG. 36 is a sectional view of the flat jaw self-tightening drill chuck provided in an embodiment of the present disclosure.
Figure 37:
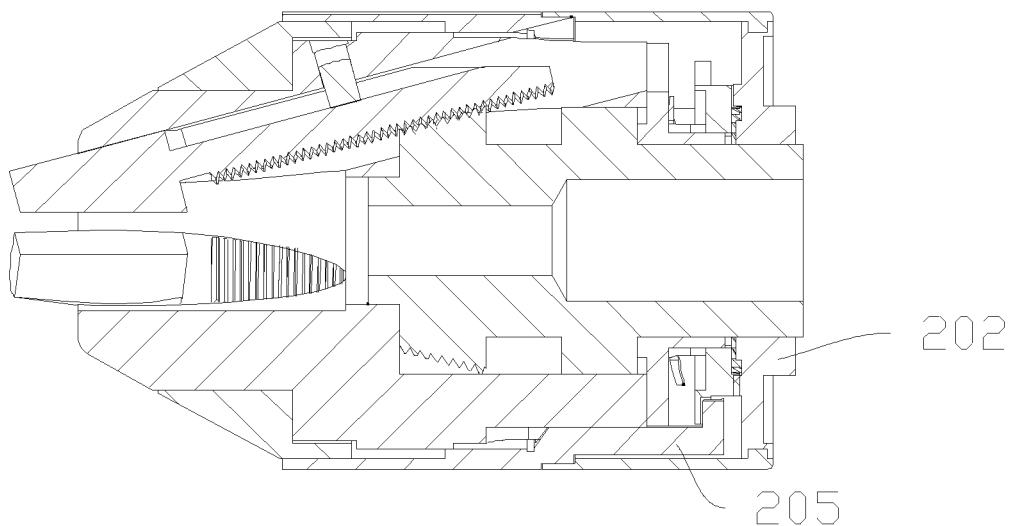
FIG. 37 is a sectional view of the internal thread self-tightening drill chuck provided in an embodiment of the present disclosure.
Figure 38:
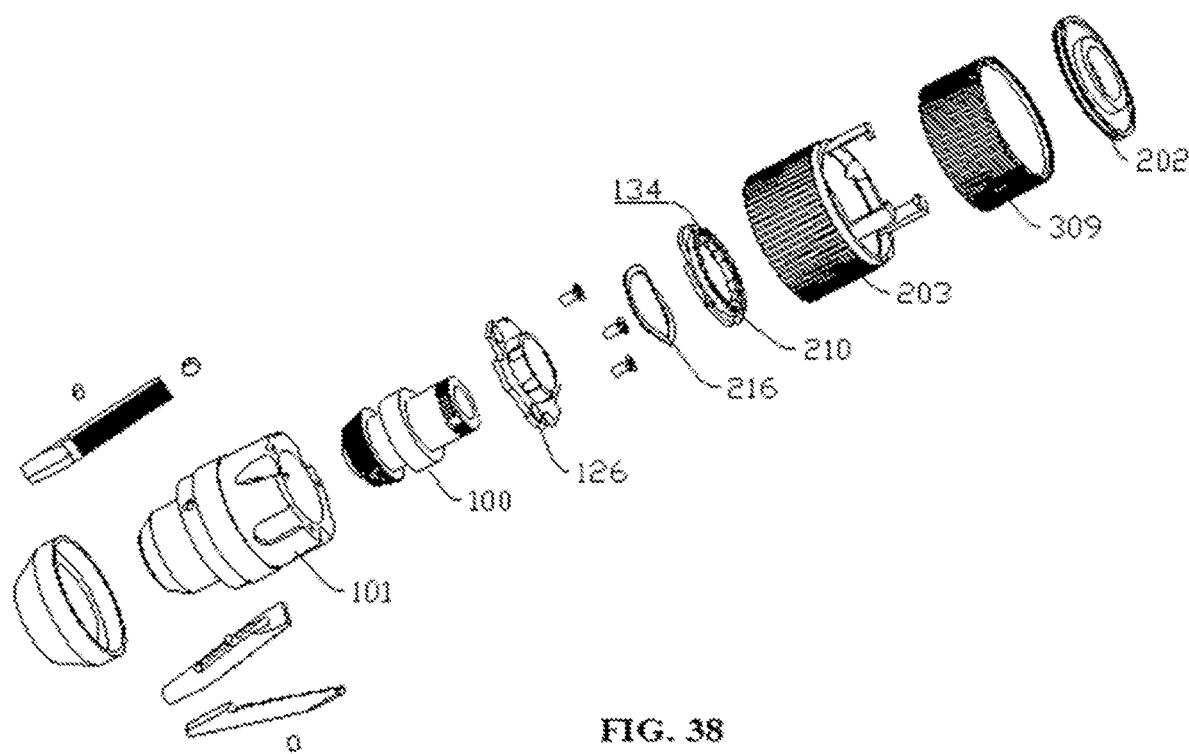
FIG. 38 is an explosive view of the internal thread self-tightening drill chuck provided in an embodiment of the present disclosure.
Figure 39:
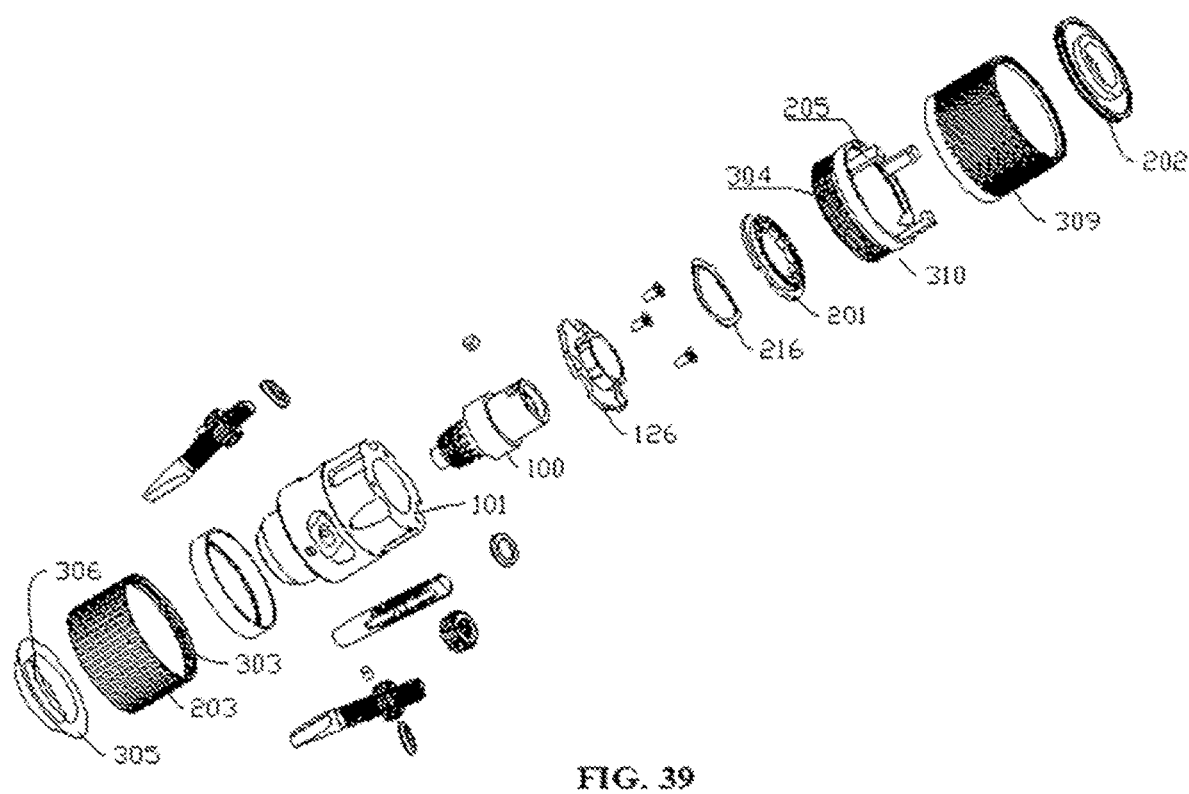
FIG. 39 is an explosive view of the gear self-tightening drill chuck provided in an embodiment of the present disclosure.
Figure 42:
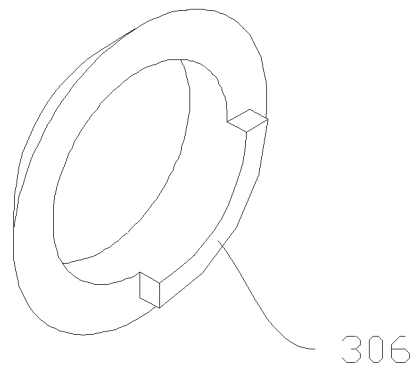
FIG. 42 is a structural schematic view of a fixing sleeve of the gear self-tightening drill chuck in FIG. 39.
Figures 40, 43:
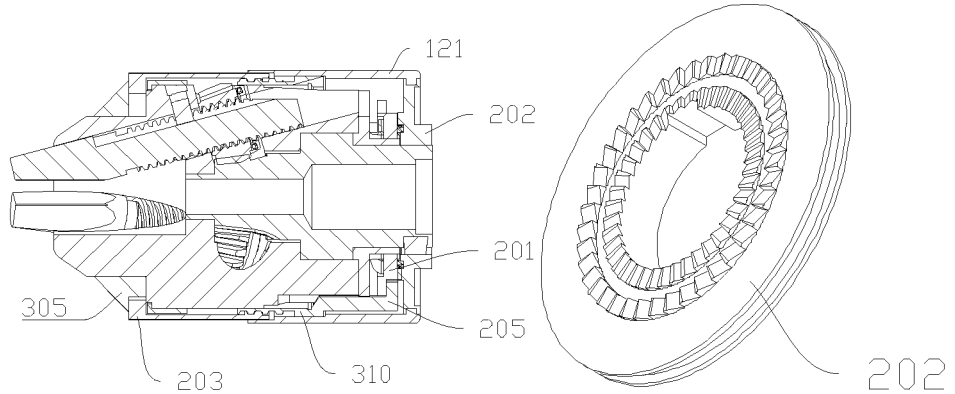
FIG. 40 is a sectional view of the gear self-tightening drill chuck provided in an embodiment of the present disclosure.
FIG. 43 is a structural schematic view of the second engagement portion of the clutch device in FIG. 39.
Figure 41:
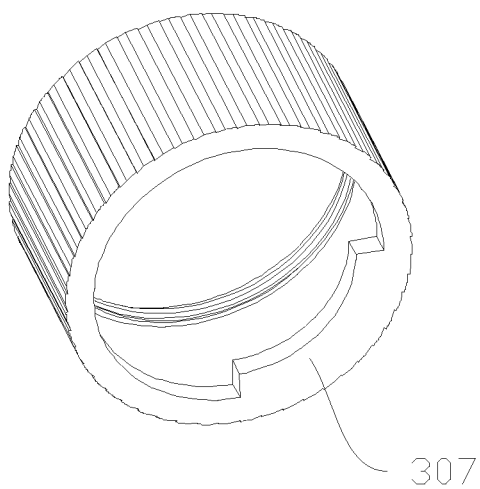
FIG. 41 is a structural schematic view of the rotating portion of the clutch device in FIG. 39.
Figure 44:
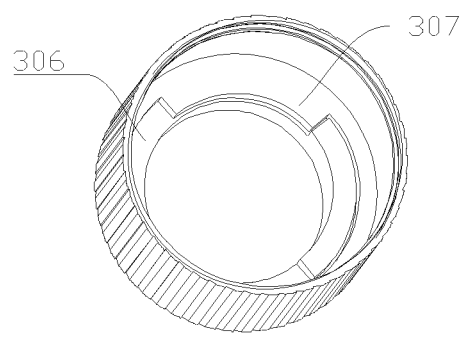
FIG. 44 is a schematic view of a first state in which the fixing sleeve cooperates with the rotating portion in FIG. 39.
Figure 45:
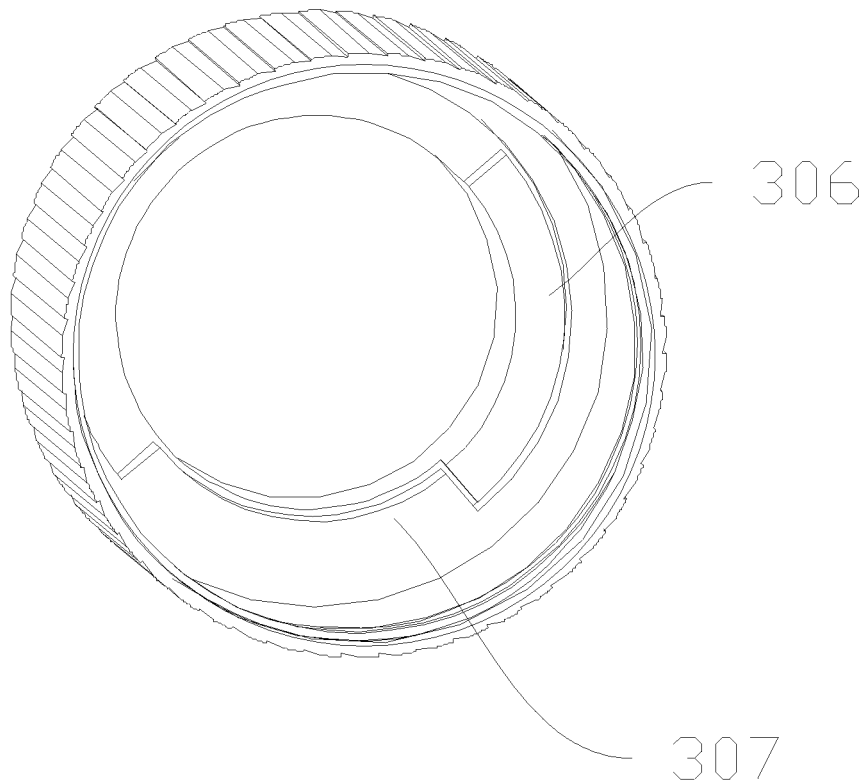
FIG. 45 is a schematic view of a second state in which the fixing sleeve cooperates with the rotating portion in FIG. 39.
Figure 46:
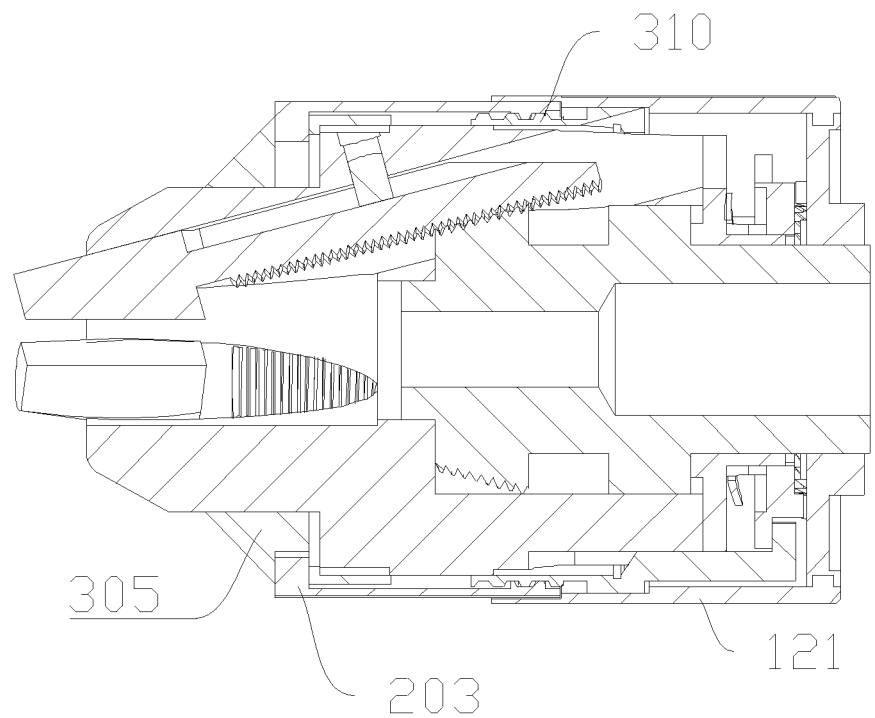
FIG. 46 is a sectional view of the internal thread self-tightening drill chuck provided in an embodiment of the present disclosure.
Figure 47:
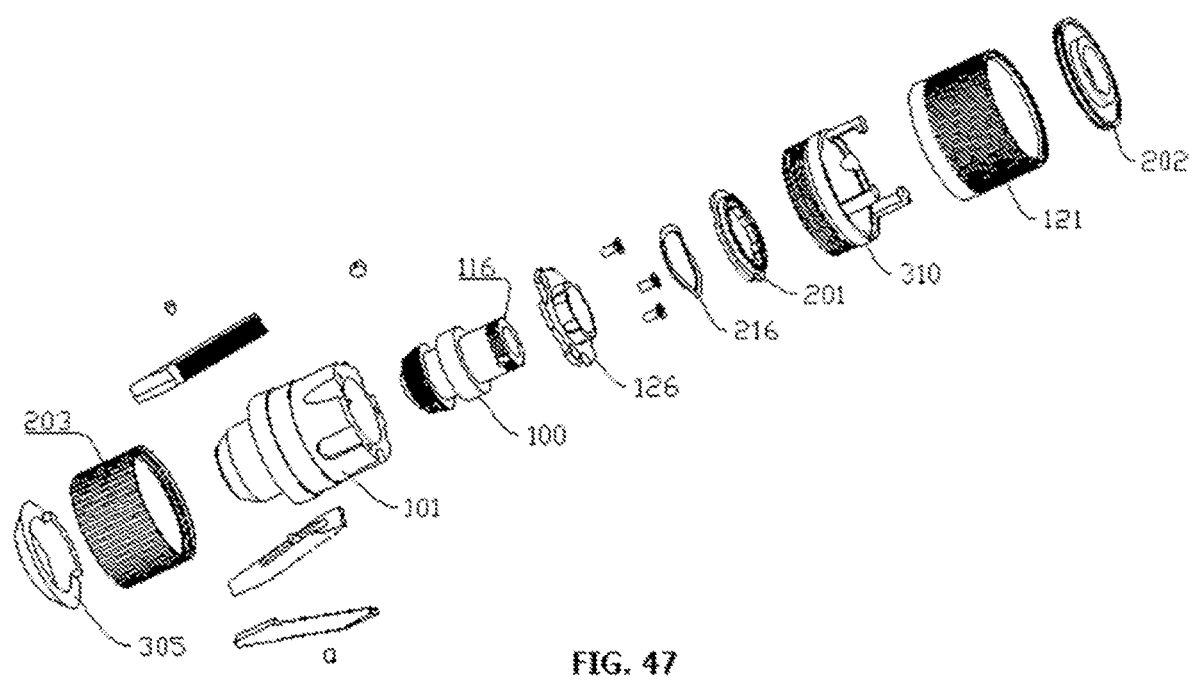
FIG. 47 is an explosive view of the internal thread self-tightening drill chuck provided in an embodiment of the present disclosure.
Figure 48:
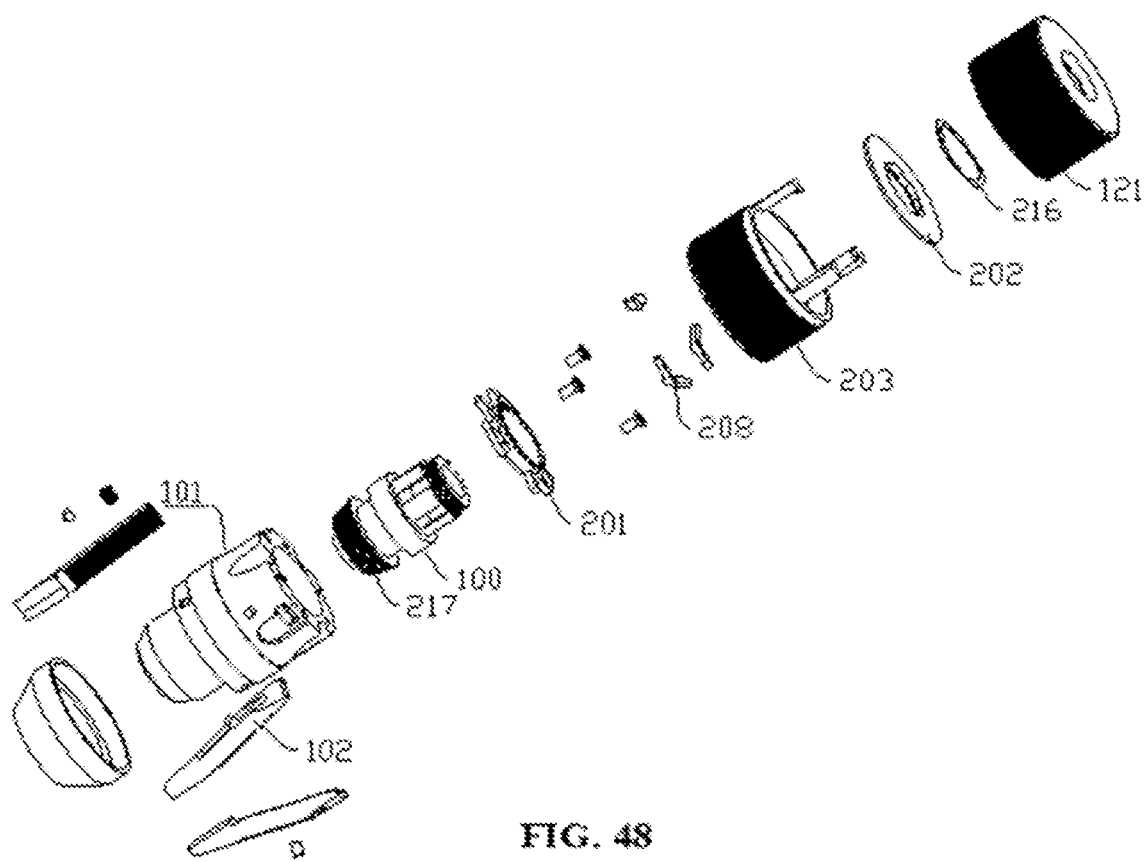
FIG. 48 is an explosive view of the internal thread self-tightening drill chuck provided in an embodiment of the present disclosure (a rear sleeve is not installed).

Referring to FIG. 1 to FIG. 48, an embodiment of the present disclosure provides a clutch device, wherein the clutch device may be applicable to a self-tightening drill chuck, and the self-tightening drill chuck may be a gear self-tightening drill chuck, a flat jaw self-tightening drill chuck, an internal thread self-tightening drill chuck, or an external thread self-clamping drill chuck. The clutch device includes a return elastic member 216, a transmission assembly, and a rotating portion 203; the transmission assembly includes at least two oppositely arranged engagement portions, wherein one engagement portion can rotate in synchronization with a front body 101 of the drill chuck, and the other engagement portion can rotate in synchronization with a rear body 100 of the drill chuck; the engagement between the two engagement portions can enable the front body 101 and the rear body 100 to rotate in synchronization with each other; rotation of the rotating portion 203 in a first direction can enable the return elastic member 216 to be compressed, so as to disengage the two engagement portions from each other; rotation of the rotating portion 203 in the second direction can enable the compressed return elastic member 216 to return to an initial position, so as to make the two engagement portions engaged with each other.

The operation principle of a gear self-tightening drill chuck comprises that a driving bevel gear 108 on the rear body 100 drives a driven bevel gear 105 mounted on the front body 101 to rotate, and the rotation of the driven bevel gear 105 then drives clamping jaws 102 to move along corresponding clamping jaw slideways 103 on the front body 101, so as to realize clamping or loosening of a drilling tool inserted in a drilling tool receiving hole of the front body 101.

The operation principle of a flat jaw self-tightening drill chuck comprises that the rear body 100 drives a driving portion 217 having an external thread structure to rotate, and the driving portion 217 drives the clamping jaws 102 connected to the driving portion to move along the corresponding clamping jaw slideways 103 on the front body 101.

The operation principle of an internal thread self-tightening drill chuck comprises that an external thread structure of the driving portion 217 on the rear body 100 cooperates with thread structures on the clamping jaws 102 to realize transmission, in this way, when the rear body 100 rotates, it may be realized that the clamping jaws 102 move along the corresponding clamping jaw slideways 103 on the front body 101.

For example, the number of engagement portions is two. The return elastic member 216 may be a wave-shaped gasket, and the rotating portion 203 is of a sleeve-shaped structure. When the transmission assembly includes two oppositely arranged engagement portions, the two engagement portions can be engaged with or disengaged from each other, and the two engagement portions realize engagement or disengagement therebetween through a tooth structure. The engagement portions may be of a sheet structure, the tooth structure refers to a plurality of teeth 206 provided on a sheet surface of the sheet structure, and the plurality of teeth are distributed in a circular shape on the sheet surface. The teeth may be ratches. The first direction is a loosening direction which is just a rotating direction of the rotating portion 203 when the drilling tool on the drill chuck can be loosened; and the second direction is a clamping direction which is just a rotating direction of the rotating portion 203 when the drilling tool on the drill chuck can be clamped. The two engagement portions are a first engagement portion 201 and a second engagement portion 202, respectively. After the rotating portion 203 rotates along the clamping direction by a certain angle, the engagement between the second engagement portion 202 and the first engagement portion 201 is realized under the action of the return elastic member 216 on the second engagement portion 202, so as to prevent loosening the drilling tool on the drill chuck; after the rotating portion 203 rotates along the loosening direction by a certain angle, the second engagement portion 202 is disengaged from the first engagement portion 201, so that the drilling tool on the drill chuck is loosened. The return elastic member 216 is a wave-shaped spring washer. After the clamping jaws 102 of the drill chuck clamp the drilling tool and when the drill chuck is observed from an operation end (for example, when the drilling tool is a drill bit, the operation end of the drill bit can drill a hole in an object) of the drilling tool towards a direction where the drill chuck is located, counterclockwise rotation is forward rotation of the drill chuck, and clockwise rotation is reverse rotation of the drill chuck. The rear body 100 is rotated forward with respect to the front body 101 so as to realize clamping of the drilling tool by the clamping jaws 102, and the rear body 100 is rotated reversely with respect to the front body 101 so as to realize loosening of the drilling tool from the clamping jaws 102. A forward rotating direction of the rear body 100 and a forward rotating direction of the front body 101 are both the same as a forward rotating direction of the drill chuck; and a reverse rotating direction of the rear body 100 and a reverse rotating direction of the front body 101 are both the same as a reverse rotating direction of the drill chuck. The rear body 100 can rotate about an axis of the rear body 100 relative to the front body 101, and the rear body 100 is provided coaxially with the front body 101. A clamping direction of the rotating portion 203 is the same as the reverse rotating direction of the drill chuck, and a loosening direction of a switch sleeve is the same as the forward rotating direction of the drill chuck. In this embodiment, the forward rotation of the rear body 100 of the drill chuck may realize clamping of the drilling tool by the clamping jaws 102, and the reverse rotation of the rear body 100 may realize loosening of the drilling tool from the clamping jaws 102; after clamping the drilling tool with the clamping jaws 102 by rotating the rear body 100 forward, the conventional forward rotation may be realized, in this case, the rear body 100 and the front body 101 rotate forward together; in cases where the clamping jaws 102 clamp the drilling tool, after the rear body 100 and the front body 101 are engaged with each other by the clutch device, a relatively stationary fixed connection state is realized by the clutch device between the rear body 100 and the front body 101, that is, the rear body 100 and the front body 101 rotate reversely together, thus realizing bidirectional rotation of the drill chuck by the clutch device, so as to drive the drilling tool to perform bidirectional operation, and the user experience is relatively good. It should be noted that the return elastic member 216 further may be a spring or the like, and a material of the wave-shaped gasket may be a metal.

Optionally, the clutch device further includes a rear sleeve 121, wherein the rear sleeve 121 is configured for fixed connection with the rear body 100, and connection between the rear sleeve 121 and the rear body 100 may be interference fit or key connection. In use, the rear body 100 can be driven to rotate by rotating the rear sleeve 121.

For the clutch device provided in this embodiment, the engagement or disengagement between two oppositely arranged engagement portions is easily realized through the rotating operation on the rotating portion 203, in this way, after one of the engagement portions is capable of rotating in synchronization with the front body 101 of the drill chuck, and the other engagement portion is capable of rotating in synchronization with the rear body 100 of the drill chuck, the engagement or disengagement between the front body 101 and the rear body 100 can be realized just by rotating the rotating portion 203, thus when the front body 101 and the rear body 100 are in an engagement state, it is advantageous to ensure the mounting stability of the drilling tool on the drill chuck if the drill chuck suddenly starts in a vibration working state or in an idling state, and avoid occurrence of loosening or detachment, in addition, bidirectional rotation of the drill chuck is also realized through the engagement between the front body 101 and the rear body 100, so as to drive the drilling tool to perform bidirectional operation.

Optionally, the clutch device further includes a trigger, and the rotation of the rotating portion 203 can enable the trigger to push one of the engagement portions to move, so that the return elastic member 216 can be compressed or return to the initial position.

For example, when the clutch device is connected to the front body 101 and the rear body 100 of the drill chuck, the rotation of the rotating portion 203 can make the return elastic member 216 to be compressed or reset; and when the return elastic member 216 is compressed, the two oppositely arranged engagement portions can be disengaged from each other, and when the compressed return elastic member 216 returns to the initial position, the engagement between the two oppositely arranged engagement portions can be realized.

Optionally, the return elastic member 216 is located outside one of the engagement portions, and inner sides of the two engagement portions are opposite to each other. The tooth structure is located inside the engagement portions. The first engagement portion 201 and the second engagement portion 202 may be both of a sheet structure.

This embodiment further provides a bidirectional rotation method of a drill chuck, wherein the drill chuck includes a rear body 100, a front body 101, and clamping jaws 102, the method includes: making the rear body 100 to rotate relative to the front body 101, so that the rear body 100 can drive the clamping jaws 102 to move; providing a clutch device between the rear body 100 and the front body 101, so as to make the rear body 100 engaged with or disengaged from the front body 101, wherein the clutch device includes a return elastic member 216, a transmission assembly, and a rotating portion 203; the transmission assembly includes at least two oppositely arranged engagement portions, wherein one engagement portion can rotate in synchronization with the front body 101 of the drill chuck, and the other engagement portion can rotate in synchronization with the rear body 100 of the drill chuck; the engagement between the two engagement portions can enable the front body 101 and the rear body 100 to rotate in synchronization with each other; rotation of the rotating portion 203 in a first direction can enable the return elastic member 216 to be compressed, so as to make the two engagement portions disengaged from each other; rotation of the rotating portion 203 in the second direction can enable the compressed return elastic member 216 to return to the initial position, so as to make the two engagement portions engaged with each other.

In an embodiment, the return elastic member 216 is located outside the second engagement portion 202, and the second engagement portion 202 is located between the return elastic member 216 and the first engagement portion 201, and the rear sleeve 121 is further configured to limit the return elastic member 216 so as to realize that the return elastic member 216 can be compressed or return to the initial position.

Optionally, when the return elastic member 216 is located outside the second engagement portion 202, the first engagement portion 201 and the front body 101 are fixedly connected with each other via screws 111, the second engagement portion 202 can move along an axial direction of the rear body 100, a rear end 116 of the rear body 100 is circumferentially provided with a strip-shaped groove 133 extending along an axial direction of the rear end, the second engagement portion 202 is sleeved over the rear end 116 of the rear body 100, an inner wall of an axial hole of the second engagement portion 202 is provided with positioning keys 134 cooperating with the strip-shaped groove 133 on the rear body 100, and the positioning keys 134 and the hole wall of the axial hole are of an integral structure, thus realizing that the rear body 100 and the second engagement portion 202 are relatively fixed to each other in the circumferential direction, and can be displaced in the axial direction. The rear sleeve 121 is further configured to limit the return elastic member 216. By limiting the return elastic member 216 with the rear sleeve 121, two objectives may be achieved, wherein the first objective is to enable the return elastic member 216 to be compressed; and the second objective is to enable the second engagement portion 202 to move in the direction towards the first engagement portion 201, when the compressed return elastic member 216 returns to the initial position, so as to achieve the objective of engaging the second engagement portion 202 with the first engagement portion 201. It should be noted that the rear body 100 and the second engagement portion 202 may also be connected through a special-shaped hole structure, so as to realize that the rear body 100 and the second engagement portion 202 are relatively fixed to each other in the circumferential direction, and can be displaced in the axial direction, wherein the special-shaped hole may be a waist round hole, a square hole, etc.

Referring to what is shown in FIG. 1 to FIG. 11, and FIG. 48, in this embodiment, the trigger includes levers 208; the rotation of the rotating portion 203 in the first direction can enable the levers 208 to pry the second engagement portion 202 so as to make the second engagement portion move along the axial direction of the rear body 100 (i.e., the levers 208 cause the second engagement portion 202 to move in a direction away from the first engagement portion 201), so that the first engagement portion 201 and the second engagement portion 202 are disengaged from each other. The rotation of the rotating portion 203 in the second direction can enable the return elastic member 216 to return to the initial position, and enable the second engagement portion 202 to move in a direction close to the first engagement portion 201, so as to make the first engagement portion 201 and the second engagement portion 202 engaged with each other.

Optionally, the trigger further includes connecting rods 205 fixed on the rotating portion 203, the connecting rods 205 extend along the axial direction of the rotating portion 203, and the connecting rods 205 are each provided with a contact 204; each lever 208 includes a first raised portion 220 and a second raised portion 221 connected to the first raised portion 220, and the first raised portion 220 and the second raised portion 221 are arranged with an angle therebetween.

For example, the angle formed between the first raised portion 220 and the second raised portion 221 is greater than 90 degrees, and the angle may be 120-170 degrees, etc., for example, the degree may be 150 degrees or 160 degrees. The each lever 208 further includes a rotation convex strip 209, and the rotation convex strip 209 is located substantially at a junction between the first raised portion 220 and the second raised portion 221; the rotation convex strip 209 contacts a surface of the rear end 116 of the front body 101, and the number of levers 208 is three. The number of connecting rods 205 is three. The contact 204 has a triangular structure 308, and an apex angle of the triangular structure 308 abuts against the first raised portion 220 or the second raised portion 221. The rotation convex strip 209 may be a cylindrical structure at least having an arc surface. When the rotating portion 203 rotates in the first direction, the apex angle of the triangular structure on the contact 204 moves from the first raised portion 220 to the second raised portion 221, wherein due to the action of the arc surface of the rotation convex strip 209, the first raised portion 220 and the second raised portion 221 may rotate around the rotation convex strip 209, in this way, it may be realized that the second engagement portion 202 moves along the axial direction of the rear body 100, so that the first engagement portion 201 and the second engagement portion 202 are disengaged from each other.

The present embodiment further provides a drill chuck, which includes a front body 101, a rear body 100, clamping jaws 102, and the clutch device in this embodiment; the rear body 100 can rotate relative to the front body 101, to make the rear body 100 drive the clamping jaws 102 to move, so as to clamp and loosen the drilling tool mounted on the drill chuck; the first engagement portion 201 is connected to the front body 101, and the second engagement portion 202 is connected to the rear body 100. The drilling tool may be a drill bit, a honing head, a boring head, or the like. The front body 101 is provided, in a circumferential direction, with an accommodating groove 222 for limiting the connecting rod 205, and the accommodating groove 222 has a groove width greater than the width of the connecting rod 205, then it may be realized that the connecting rod 205 rotates by a certain angle with the rotating portion 203, so as to achieve the purpose of making the first engagement portion 201 disengaged from or engaged with the second engagement portion 202. In order to facilitate rotation of the rotating portion 203 in the second direction after realizing the disengagement of the first engagement portion 201 and the second engagement portion 202 from each other through the rotation of the rotating portion 203 in the first direction, a spring groove 223 may be provided in one accommodating groove 222, a return spring 118 is installed in the spring groove 223, and one end of the return spring 118 abuts against one end of the spring groove 223 in a length direction, the other end of the return spring 118 abuts against the connecting rod 205, and an extending direction of the return spring 118 is perpendicular to a length direction of the accommodating groove 222; and the length direction of the accommodating groove 222 is parallel to the axial direction of the front body 101. The rotating portion 203 is of a sleeve-shaped structure, and the sleeve-shaped structure is sleeved on the front body 101, and the sleeve-shaped structure is limited by a shaft shoulder 224 on the front body 101, so as to avoid the sleeve-shaped structure from detaching from the front body 101. The rear end 116 of the rear body 100 passes through the first engagement portion 201, and the rear body 100 and the first engagement portion are arranged with a gap therebetween. After the rear end 116 of the rear body 100 passes through the first engagement portion 201, the rear end 116 of the rear body 100 is connected to the second engagement portion 202, so as to realize that the rear body 100 and the second engagement portion 202 are relatively fixed to each other in the circumferential direction, and can be displaced in the axial direction; after passing through the second engagement portion 202, the rear end 116 of the rear body 100 is fixedly connected to the rear sleeve 121. The rear body 100 has the shaft shoulder 224 configured in such a manner that the rear body 100 will not leave the front body 101 after the rear end 116 of the rear body 100 passes through the first engagement portion 201. An end surface of the rear end 116 of the front body 101 is further provided with a rotation groove 210 for allowing the rotation convex strip 209 to be located therein.

For example, the drill chuck may be a self-tightening drill chuck, and the self-tightening drill chuck may be a gear self-tightening drill chuck, a flat jaw self-tightening drill chuck or an internal thread self-tightening drill chuck. When the first engagement portion 201 and the second engagement portion 202 are disengaged from each other, the forward rotation of the rear body 100 may realize the clamping of the drilling tool by the clamping jaws 102, and the reverse rotation of the rear body 100 may realize the loosening of the drilling tool from the clamping jaws 102. It should be noted that in this embodiment, the structure allowing the rear body 100 of the self-tightening drill chuck to drive the clamping jaws 102 to move and the installation of the clamping jaws 102 on the front body 101 are prior art, and are not described in detail in this embodiment.

Referring to what is shown in FIG. 12 to FIG. 19, in this embodiment, the trigger includes levers 208; the rotation of the rotating portion 203 in the first direction can enable the levers 208 to pry the second engagement portion 202 so as to make the second engagement portion move along the axial direction of the rear body 100 (i.e., the levers 208 cause the second engagement portion 202 to move in a direction away from the first engagement portion 201), so that the first engagement portion 201 and the second engagement portion 202 are disengaged from each other. The rotation of the rotating portion 203 in the second direction can enable the return elastic member 216 to return to an initial position, and enable the second engagement portion 202 to move in a direction close to the first engagement portion 201, so as to make the first engagement portion 201 and the second engagement portion 202 engaged with each other.

Optionally, the levers 208 are rotatably mounted in the circumferential direction of the first engagement portion 201 through the pin shafts 225; the rotating portion 203 is of a sleeve-shaped structure, and an inner surface of the sleeve-shaped structure is provided with protruding blocks 231 configured to push the levers 208 to rotate around the respective pin shafts 225.

For example, the first engagement portion 201 is provided with a plurality of avoiding grooves 226 in the circumferential direction thereof, the pin shafts 225 are located on groove walls of the respective avoiding grooves 226, and an axial direction of each pin shaft 225 may be parallel to a radial direction of the rotating portion 203. Each level 208 is provided with a pin hole 227 for allowing the corresponding pin shaft 225 to pass therethrough. The lever 208 includes a main body portion 228 and an additional portion 229, and the pin hole 227 is located in the main body portion 228. The additional portion 229 is configured to contact the second engagement portion 202 so as to pry the second engagement portion 202 so as to make the second engagement portion move. When the rotating portion 203 rotates in a direction that the first engagement portion 201 is disengaged from the second engagement portion 202, the rotating portion 203 applies a force to the main body portion 228 of each lever 208, the lever 208 rotates around the pin shaft 225, and an edge of the additional portion 229 abuts against the second engagement portion 202 so as to achieve the purpose of prying the second engagement portion 202; when the rotating portion 203 rotates in a direction of realizing engagement of the first engagement portion 201 and the second engagement portion 202 with each other, the second engagement portion 202 is forced to move in the direction in which the first engagement portion 201 is located due to the action of the return elastic member 216, and the second engagement portion 202 applies a force to the additional portion 229, so that the lever 208 is rotated again so that the lever 208 returns to the initial position. The number of avoiding grooves 226, the number of levers 208, and the number of protruding blocks 231 are equal to each other, and all of them may be three.

The present embodiment further provides a drill chuck, which includes a front body 101, a rear body 100, clamping jaws 102, and the clutch device in this embodiment; the rear body 100 can rotate relative to the front body 101, so that the rear body 100 can drive the clamping jaws 102 to move, so as to clamp or loosen the drilling tool mounted on the drill chuck; the first engagement portion 201 is connected to the front body 101, and the second engagement portion 202 is connected to the rear body 100. The drilling tool may be a drill bit, a honing head, a boring head, or the like. The front body 101 is provided, in a circumferential direction, with accommodating grooves 222 for accommodating the levers 208 and the protruding blocks 231, and the accommodating grooves 222 each should have a width greater than a sum of a width of the main body portion 228 of the lever 208 and a width of the protruding block 231, in this way, when the rotating portion 203 rotates, the lever 208 can be enabled to rotate in the accommodating groove 222, so as to achieve the purpose of making the first engagement portion 201 disengaged from or engaged with the second engagement portion 202. The rotating portion 203 is of a sleeve-shaped structure, and the sleeve-shaped structure is sleeved on the front body 101, and the sleeve-shaped structure is limited by a shaft shoulder 224 on the front body 101, so as to avoid the sleeve-shaped structure from detaching from the front body 101. The rear end 116 of the rear body 100 passes through the first engagement portion 201, and the rear body 100 and the first engagement portion are arranged with a gap therebetween. After the rear end 116 of the rear body 100 passes through the first engagement portion 201, the rear end 116 of the rear body 100 is connected to the second engagement portion 202, so as to realize that the rear body 100 and the second engagement portion 202 are relatively fixed to each other in the circumferential direction and can be displaced in the axial direction; after passing through the second engagement portion 202, the rear end 116 of the rear body 100 is fixedly connected to the rear sleeve 121. The rear body 100 has the shaft shoulder 224 configured in such a manner that the rear body 100 will not leave the front body 101 after the rear end 116 of the rear body 100 passes through the first engagement portion 201.

For example, the drill chuck may be a self-tightening drill chuck, and the self-tightening drill chuck may be a gear self-tightening drill chuck, a flat jaw self-tightening drill chuck or an internal thread self-tightening drill chuck. When the first engagement portion 201 and the second engagement portion 202 are disengaged from each other, the forward rotation of the rear body 100 may realize the clamping of the drilling tool by the clamping jaws 102, and the reverse rotation of the rear body 100 may realize the loosening of the drilling tool from the clamping jaws 102. It should be noted that in this embodiment, the structure in which the rear body 100 of the self-tightening drill chuck drives the clamping jaws 102 to move and the installation of the clamping jaws 102 on the front body 101 are prior art, and are not described in detail in this embodiment.

Referring to what is shown in FIG. 20 to FIG. 27, in this embodiment, the trigger includes levers 208; the rotation of the rotating portion 203 in the first direction can enable the levers 208 to pry the second engagement portion 202 so as to make the second engagement portion move along the axial direction of the rear body 100 (i.e., the levers 208 causes the second engagement portion 202 to move in a direction away from the first engagement portion 201), so that the first engagement portion 201 and the second engagement portion 202 are disengaged from each other. The rotation of the rotating portion 203 in the second direction can enable the return elastic member 216 to return to an initial position, and enable the second engagement portion 202 to move in a direction close to the first engagement portion 201, so as to make the first engagement portion 201 and the second engagement portion 202 engaged with each other. The rotating portion 203 is of a sleeve-shaped structure.

Optionally, the first engagement portion 201 is provided with positioning holes 234, and each lever 208 includes an insertion portion 232 and a prying portion 233; a length extending direction of the insertion portion 232 and a length extending direction of the prying portion 233 have an angle therebetween, the insertion portion 232 is inserted into the corresponding positioning hole 234, the rotating portion 203 is of a sleeve-shaped structure, and an inner surface of the sleeve-shaped structure is provided with the protruding blocks 231 configured to push the corresponding insertion portion 232 to sway in the corresponding positioning hole 234, so as to enable the prying portion 233 to move.

For example, the positioning hole 234 may be a rectangular hole, and after the insertion portion 232 is inserted into the rectangular hole, the insertion portion 232 and the rectangular hole are in clearance fit with each other, so that the insertion portion 232 can sway in the rectangular hole. The number of positioning holes 234 and the number of levers 208 may be both plural, for example, three, so that the movement of the second engagement portion 202 may be stable. When the rotating portion 203 rotates in a direction of realizing disengagement of the first engagement portion 201 and the second engagement portion 202 from each other, the rotating portion 203 applies a force to the insertion portion 232 of the lever 208, so that an end portion of the prying portion 233 is lifted so as to abut against the second engagement portion 202, thus achieving the purpose of prying the second engagement portion 202; when the rotating portion 203 rotates in a direction of realizing engagement of the first engagement portion 201 and the second engagement portion 202 with each other, the second engagement portion 202 is forced due to the action of the return elastic member 216 to move in the direction in which the first engagement portion 201 is located, and the second engagement portion 202 applies a force to the prying portion 233, so that the lever 208 returns to the initial position.

The present embodiment further provides a drill chuck, which includes a front body 101, a rear body 100, clamping jaws 102, and the clutch device in this embodiment; the rear body 100 can rotate relative to the front body 101, so that the rear body 100 can drive the clamping jaws 102 to move, so as to clamp or loosen the drilling tool mounted on the drill chuck; the first engagement portion 201 is connected to the front body 101, and the second engagement portion 202 is connected to the rear body 100. The drilling tool may be a drill bit, a honing head, a boring head, or the like. The front body 101 is provided, in a circumferential direction, with accommodating grooves 222 for accommodating the protruding blocks 231, and the accommodating grooves 222 each should have a width greater than a width of the protruding block 231, in this way, when the rotating portion 203 rotates, the protruding block 231 can be enabled to move in the accommodating groove 222, so as to achieve the purpose of disengaging or engaging the first engagement portion 201 and the second engagement portion 202. The rotating portion 203 is of a sleeve-shaped structure, and the sleeve-shaped structure is sleeved on the front body 101, and the sleeve-shaped structure is limited by a shaft shoulder 224 on the front body 101, avoiding the sleeve-shaped structure from detaching from the front body 101. The rear end 116 of the rear body 100 passes through the first engagement portion 201, and the rear body 100 and the first engagement portion are arranged with a gap therebetween. After the rear end 116 of the rear body 100 passes through the first engagement portion 201, the rear end 116 of the rear body 100 is connected to the second engagement portion 202, so as to realize that the rear body 100 and the second engagement portion 202 are relatively fixed to each other in the circumferential direction, and can be displaced in the axial direction; after passing through the second engagement portion 202, the rear end 116 of the rear body 100 is fixedly connected to the rear sleeve 121. The rear body 100 has the shaft shoulder 224 configured in such a manner that the rear body 100 will not leave the front body 101 after the rear end 116 of the rear body 100 passes through the first engagement portion 201.

For example, the drill chuck may be a self-tightening drill chuck, and the self-tightening drill chuck may be a gear self-tightening drill chuck, a flat jaw self-tightening drill chuck or an internal thread self-tightening drill chuck. When the first engagement portion 201 and the second engagement portion 202 are disengaged from each other, the forward rotation of the rear body 100 may realize the clamping of the drilling tool by the clamping jaws 102, and the reverse rotation of the rear body 100 may realize the loosening of the drilling tool from the clamping jaws 102. It should be noted that in this embodiment, the structure in which the rear body 100 of the self-tightening drill chuck drives the clamping jaws 102 to move and the installation of the clamping jaw 102 on the front body 101 are prior art, and are not described in detail in this embodiment.

Referring to what is shown in FIG. 28 to FIG. 31, in this embodiment, the return elastic member 216 is located outside the first engagement portion 216, and the first engagement portion 201 is located between the return elastic member 216 and the second engagement portion 202. The clutch device further includes an end cap 126, and compression or returning of the return elastic member 216 is realized through the rotating portion 203. When the return elastic member 216 is located outside the first engagement portion 201, the first engagement portion 201 can move along the axial direction of the front body 101, and the second engagement portion 202 is fixedly connected to the rear body 100; as the front body and the rear body are coaxially provided, the axial movement of the first engagement portion along the front body is equivalent to the axial movement of the first engagement portion along the rear body.

For example, the end cap 126 includes a disc portion 301 and an axial convex portion 302 connected to the disc portion 301; the disc portion 301 is fixedly connected to the front body 101 via screws 111; and the end cap 126 is provided with an axial hole for the rear end 116 of the rear body 100 to pass therethrough. The return elastic member 216 is sleeved outside the axial convex portion 302 of the end cap 126, and an outer circumferential surface of the axial convex portion 302 is provided with a plurality of strip-shape grooves 133 extending along an axial direction of the axial convex portion 302, an inner wall of an axial hole of the first engagement portion 201 is provided with positioning keys 134 cooperating with the respective strip-shaped grooves 133 on the axial convex portion 302, and the positioning keys 134 and the hole wall of the axial hole of the first engagement portion 201 are of an integral structure, thus, it is realized that the axial convex portion 302 and the first engagement portion 201 are relatively fixed to each other in the circumferential direction, and can be displaced in the axial direction. The rear sleeve includes a sleeve body 309 and a sleeve cover, the sleeve cover and the sleeve body can be fixedly connected to each other by means of an interference fit, the second engagement portion 202 and the sleeve cover of the rear sleeve 121 are of an integral structure, the rear end 116 of the rear body 100, after passing through the axial hole of the axial convex portion 302, is inserted into the axial hole of the second engagement portion 202, and the rear end 116 of the rear body 100 and the second engagement portion 202 are fixedly connected to each other by interference fit, key connection, or pin connection. The return elastic member 216 is located between the disc portion 301 of the end cap 126 and the first engagement portion 201.

In this embodiment, the trigger includes levers 208; the rotation of the rotating portion 203 in the first direction can enable the levers 208 to pry the first engagement portion 201 so as to make the first engagement portion move along the axial direction of the front body 101 (i.e., the levers 208 cause the first engagement portion 201 to move in a direction away from the second engagement portion 202, that is, making the first engagement portion move in a direction close to the rear end of the front body), so that the first engagement portion 201 and the second engagement portion 202 are disengaged from each other. The rotation of the rotating portion 203 in the second direction can enable the return elastic member 216 to return to the initial position, and enable the first engagement portion 201 to move in a direction close to the second engagement portion 202, so as to make the first engagement portion 201 and the second engagement portion 202 engaged with each other. The rotating portion 203 is of a sleeve-shaped structure.

Optionally, the first engagement portion 201 is provided with positioning holes 234, and each lever 208 includes an insertion portion 232 and a prying portion 233; a length extending direction of the insertion portion 232 and a length extending direction of the prying portion 233 have an angle therebetween, the insertion portion 232 is inserted into the corresponding positioning hole 234, the rotating portion 203 is of a sleeve-shaped structure, and an inner surface of the sleeve-shaped structure is provided with the protruding blocks 231 configured to push the respective insertion portions 232 to sway in the respective positioning holes 234, so as to enable the prying portion 233 to move.

For example, each positioning hole 234 may be a rectangular hole, and after the insertion portion 232 is inserted into the rectangular hole, the insertion portion 232 and the rectangular hole are in clearance fit with each other, so that the insertion portion 232 can sway in the rectangular hole. The number of positioning holes 234 and the number of levers 208 may be both plural, for example 3, so that the movement of the first engagement portion 201 may be stable. When the rotating portion 203 rotates in a direction of realizing disengagement of the first engagement portion 201 and the second engagement portion 202 from each other, the rotating portion 203 applies a force to the insertion portion 232 of the lever 208, so that one end of the prying portion 233 abuts against a surface of the second engagement portion 202, the other end of the prying portion 233 abuts against a surface of the first engagement portion 201. As the second engagement portion 202 is fixedly connected to the rear body 100, and relative axial displacement can occur between the first engagement portion 201 and the front body, the first engagement portion is enabled to move in the direction towards the rear end of the front body since the second engagement portion 202 is stationary and the first engagement portion 201 is pressed against the first engagement portion 201 under the action of the other end of the prying portion 233; when the rotating portion 203 rotates in a direction of realizing engagement between the first engagement portion 201 and the second engagement portion 202, the first engagement portion 201 is forced due to the action of the return elastic member 216 to move in the direction in which the second engagement portion 202 is located, and the first engagement portion 201 applies a force to the prying portion 233, so as to make the lever 208 return to the initial position.

The present embodiment further provides a drill chuck, which includes a front body 101, a rear body 100, clamping jaws 102, and the clutch device in this embodiment; the rear body 100 can rotate relative to the front body 101, so that the rear body 100 can drive the clamping jaws 102 to move, so as to clamp or loosen the drilling tool mounted on the drill chuck; the first engagement portion 201 is connected to the front body 101, and the second engagement portion 202 is connected to the rear body 100. The drilling tool may be a drill bit, a honing head, a boring head, or the like. The front body 101 is provided, in a circumferential direction, with accommodating grooves 222 for accommodating the protruding blocks 231, and each accommodating groove 222 should have a width greater than a sum of a width of the protruding block 231 and a width of the insertion portion, in this way, when the rotating portion 203 rotates, each protruding block 231 can be enabled to move in the corresponding accommodating groove 222 and the insertion portion is made to sway in the corresponding accommodating groove, so as to achieve the purpose of disengaging or engaging the first engagement portion 201 and the second engagement portion 202. The rotating portion 203 is of a sleeve-shaped structure, and the sleeve-shaped structure is sleeved over the front body 101, and the sleeve-shaped structure is limited by a shaft shoulder 224 on the front body 101, avoiding the sleeve-shaped structure from detaching from the front body 101. The rear end 116 of the rear body 100 passes through an axial hole of an axial convex portion 302 of an end cap 126, and the rear body 100 and the axial convex portion 302 are arranged with a gap therebetween. After the rear end 116 of the rear body 100 passes through the axial hole of the axial convex portion 302 of the end cap 126, the rear end 116 of the rear body 100 is connected to the second engagement portion 202, so as to realize that the rear body 100 and the second engagement portion 202 can be fixedly connected to each other. The rear body 100 has the shaft shoulder 224 configured in such a manner that the rear body 100 will not leave the front body 101 after the rear end 116 of the rear body 100 passes through the axial hole of the axial convex portion 302, and relative axial displacement substantially will not occur between the rear body 100 and the front body 101. The disc portion 301 of the end cap 126 is provided, in a circumferential direction, with a plurality of avoiding grooves 226 for avoiding the insertion portions of the levers, and a width of each avoiding groove 226 is substantially equal to a width of the accommodating groove 222, thus the swaying of the insertion portion is not affected.

For example, the drill chuck may be a self-tightening drill chuck, and the self-tightening drill chuck may be a gear self-tightening drill chuck, a flat jaw self-tightening drill chuck or an internal thread self-tightening drill chuck, and in this embodiment, the self-tightening drill chuck being a gear self-tightening drill chuck is taken as an example. When the first engagement portion 201 and the second engagement portion 202 are disengaged from each other, the forward rotation of the rear body 100 may realize the clamping of the drilling tool by the clamping jaws 102, and the reverse rotation of the rear body 100 may realize the loosening of the drilling tool from the clamping jaws 102. It should be noted that in this embodiment, the structure in which the rear body 100 of the self-tightening drill chuck drives the clamping jaws 102 to move and the installation of the clamping jaws 102 on the front body 101 are prior art, and are not described in detail in this embodiment.

Referring to what is shown in FIG. 32 to FIG. 38, in this embodiment, the return elastic member 216 is located outside the first engagement portion 216, and the first engagement portion 201 is located between the return elastic member 216 and the second engagement portion 202. The clutch device further includes an end cap 126, and compression or returning of the return elastic member 216 is realized through the rotating portion 203. When the return elastic member 216 is located outside the first engagement portion 201, the first engagement portion 201 can move along the axial direction of the front body 101, and the second engagement portion 202 is fixedly connected to the rear body 100.

For example, the end cap 126 includes a disc portion 301 and an axial convex portion 302 connected to the disc portion 301; the disc portion 301 is fixedly connected to the front body 101 via screws 111; and the end cap 126 is provided with an axial hole for the rear end 116 of the rear body 100 to pass therethrough. The return elastic member 216 is sleeved outside the axial convex portion 302 of the end cap 126, and an outer circumferential surface of the axial convex portion 302 is provided with a plurality of strip-shape grooves 133 extending along an axial direction of the axial convex portion 302, an inner wall of an axial hole of the first engagement portion 201 is provided with positioning keys 134 cooperating with the strip-shaped grooves 133 on the axial convex portion 302, and the positioning keys 134 and the hole wall of the axial hole of the first engagement portion 201 are of an integral structure, thus, it is realized that the axial convex portion 302 and the first engagement portion 201 are relatively fixed to each other in the circumferential direction, and can be displaced in the axial direction. The rear sleeve includes a sleeve body 309 and a sleeve cover, the sleeve cover and the sleeve body can be fixedly connected to each other by means of an interference fit, the second engagement portion 202 and the sleeve cover of the rear sleeve 121 are of an integral structure, the rear end 116 of the rear body 100, after passing through the axial hole of the axial convex portion 302, is inserted into the axial hole of the second engagement portion 202, and the rear end 116 of the rear body 100 and the second engagement portion 202 are fixedly connected to each other by interference fit, key connection, pin connection. The return elastic member 216 is located between the disc portion 301 of the end cap 126 and the first engagement portion 201.

Optionally, the trigger includes connecting rods 205 fixed on the rotating portion 203, and each connecting rod 205 extends along the axial direction of the rotating portion 203, and the each connecting rod 205 is provided with a contact 204; contact sockets 235 are provided in a surface of the first engagement portion 201; and each contact 204 can enter or leave the corresponding contact socket 235 along with the rotation of the rotating portion 203.

For example, the rotating portion 203 is of a sleeve-shaped structure, and an extending direction of the connecting rod 205 is parallel to an axial direction of the sleeve-shaped structure. One end of each connecting rod 205 is connected to the sleeve-shaped structure, and the other end of the each connecting rod 205 is provided with the contact 204, and the contact 204 at least has a first arc surface 236; and the contact pocket 235 is located on an inner side surface 132 of the first engagement portion 201. The contact socket 235 has a second arc surface matching the first arc surface 236 on the contact 204, that is, a bottom of the contact socket 235 is of an arc surface structure. When the rotating portion 203 rotates in a direction of realizing disengagement of the first engagement portion 201 and the second engagement portion 202 from each other, the connecting rod 205 rotates with the rotating portion 203, and the contact 204 on the connecting rod 205 leaves the contact socket 235, then the contact 204 abuts against the inner side surface 132 of the first engagement portion 201, in this way, the contacts 204 can enable the first engagement portion 201 to move, and the first engagement portion 201 compresses the return elastic member 216 again, so as to achieve the purpose that the first engagement portion 201 is disengaged from the second engagement portion 202; when the rotating portion 203 rotates in a direction of realizing engagement between the first engagement portion 201 and the second engagement portion 202, the connecting rods 205 rotates with the rotating portion 203, the contacts 204 on the connecting rods 205 then enter the respective contact sockets 235, and the return elastic member 216 can enable the first engagement portion 201 to move in a direction in which the second engagement portion 202 is located, so as to achieve the purpose of engaging the second engagement portion 202 with the first engagement portion 201.

The present embodiment further provides a drill chuck, which includes a front body 101, a rear body 100, clamping jaws 102, and the clutch device in this embodiment; the rear body 100 can rotate relative to the front body 101, so that the rear body 100 can drive the clamping jaws 102 to move, so as to clamp or loosen the drilling tool mounted on the drill chuck; the first engagement portion 201 is connected to the front body 101, and the second engagement portion 202 is connected to the rear body 100. The drilling tool may be a drill bit, a honing head, a boring head, or the like. The front body 101 is provided, in a circumferential direction, with a plurality of accommodating grooves 222 for limiting the connecting rods 205, and the accommodating grooves 222 each should have a width greater than that of the connecting rod 205, in this way, when the rotating portion 203 rotates, the connecting rod 205 can have a rotation angle in the corresponding accommodating groove 222, so as to achieve the purpose of disengaging or engaging the first engagement portion 201 and the second engagement portion 202. The rotating portion 203 is sleeved over the front body 101, and the sleeve-shaped structure is limited by a shaft shoulder 224 on the front body 101, avoiding the sleeve-shaped structure from detaching from the front body 101. The rear end 116 of the rear body 100 passes through the first engagement portion 201, and the rear body 100 and the first engagement portion are arranged with a gap therebetween, so as to ensure that the rear body 100 can rotate relative to the first engagement portion 201. The rear body 100 has the shaft shoulder 224 configured in such a manner that the rear body 100 will not leave the front body 101 after the rear end 116 of the rear body 100 passes through the first engagement portion 201.

For example, the drill chuck may be a self-tightening drill chuck, and the self-tightening drill chuck may be a gear self-tightening drill chuck, a flat jaw self-tightening drill chuck or an internal thread self-tightening drill chuck. When the first engagement portion 201 and the second engagement portion 202 are disengaged from each other, the forward rotation of the rear body 100 may realize the clamping of the drilling tool by the clamping jaws 102, and the reverse rotation of the rear body 100 may realize the loosening of the drilling tool from the clamping jaws 102. It should be noted that in this embodiment, the structure in which the rear body 100 of the self-tightening drill chuck drives the clamping jaws 102 to move and the installation of the clamping jaw 102 on the front body 101 are prior art, and are not described in detail in this embodiment.

Referring to what is shown in FIG. 39 to FIG. 47, in this embodiment, the return elastic member 216 is located outside the first engagement portion 216, and the first engagement portion 201 is located between the return elastic member 216 and the second engagement portion 202. The clutch device further includes an end cap 126, and compression or returning of the return elastic member 216 is realized through the rotating portion 203. When the return elastic member 216 is located outside the first engagement portion 201, the first engagement portion 201 can move along the axial direction of the front body 101, and the second engagement portion 202 is fixedly connected to the rear body 100

For example, the end cap 126 includes a disc portion 301 and an axial convex portion 302 connected to the disc portion 301; the disc portion 301 is fixedly connected to the front body 101 via screws 111; and the end cap 126 is provided with an axial hole for the rear end 116 of the rear body 100 to pass therethrough. The return elastic member 216 is sleeved outside the axial convex portion 302 of the end cap 126, and an outer circumferential surface of the axial convex portion 302 is provided with a plurality of strip-shape grooves 133 extending along an axial direction of the axial convex portion 302, an inner wall of an axial hole of the first engagement portion 201 is provided with positioning keys 134 cooperating with the strip-shaped grooves 133 on the axial convex portion 302, and each positioning key 134 and the hole wall of the axial hole of the first engagement portion 201 are of an integral structure, thus it is realized that the axial convex portion 302 and the first engagement portion 201 are relatively fixed to each other in the circumferential direction, and can be displaced in the axial direction. The rear sleeve includes a sleeve body 309 and a sleeve cover, the sleeve cover and the sleeve body can be fixedly connected to each other by means of an interference fit, the second engagement portion 202 and the sleeve cover of the rear sleeve 121 are of an integral structure, the rear end 116 of the rear body 100 is inserted, after passing through the axial hole of the axial convex portion 302, into the axial hole of the second engagement portion 202, and the rear end 116 of the rear body 100 and the second engagement portion 202 are fixedly connected to each other by interference fit, key connection, or pin connection. The return elastic member 216 is located between the disc portion 301 of the end cap 126 and the first engagement portion 201. The rear body 100 has the shaft shoulder 224 configured in such a manner that the rear body 100 will not leave the front body 101 after the rear end 116 of the rear body 100 passes through the end cap 126.

Optionally, the trigger includes a follower portion 310 and connecting rods 205 fixed on the follower portion 310, each connecting rod 205 extends along the axial direction of the follower portion 310, and the each connecting rod 205 is provided with a contact 204; the follower portion 310 and the rotating portion 203 are in threaded transmission with each other; connecting rod guide grooves are provided in the circumferential direction of the front body 101 for enabling the connecting rods 205 to move along the length extending direction of the connecting rod guide groove.

For example, the rotating portion 203 is of a sleeve-shaped structure, and an extending direction of each connecting rod 205 is parallel to an axial direction of the sleeve-shaped structure. The follower portion 310 is of a sleeve-shape. The inner wall of the axial hole of the rotating portion 203 has an internal thread 303, and an outer surface of the follower portion 310 has an external thread 304 matching the internal thread on the rotating portion 203. When the rotating portion 203 rotates in a direction of realizing disengagement of the first engagement portion 201 and the second engagement portion 202 from each other, the rotating portion 203 and the follower portion 310 are in threaded transmission with each other, the contact 204 on each connecting rod 205 of the follower portion 310 applies a force to the first engagement portion 201, so that the first engagement portion 201 compresses the return elastic member 210, so as to achieve the purpose of disengaging the first engagement portion 201 and the second engagement portion 202 from each other; when the rotating portion 203 rotates in the direction of realizing engagement between the first engagement portion 201 and the second engagement portion 202, the return elastic member 216 enables the first engagement portion 201 to move in the direction in which the second engagement portion 202 is located, so as to achieve the purpose of engaging the second engagement portion 202 and the first engagement portion 201 with each other.

The present embodiment further provides a drill chuck, which includes a front body 101, a rear body 100, clamping jaws 102, and the clutch device in this embodiment; the rear body 100 can rotate relative to the front body 101, so that the rear body 100 can drive the clamping jaws 102 to move, so as to clamp or loosen the drilling tool mounted on the drill chuck; the first engagement portion 201 is connected to the front body 101, and the second engagement portion 202 is connected to the rear body 100. The drilling tool may be a drill bit, a honing head, a boring head, or the like. The front body 101 is provided, in the circumferential direction, with a plurality of accommodating grooves 222 for limiting the connecting rods 205, so that the follower portion 310 moves along the axial direction of the front body 101, in this way, when the rotating portion 203 rotates, the follower portion 310 moves along the axial direction of the front body 101, and the contacts 204 on the follower part 310 can compress or release the return elastic member 216, so as to achieve the purpose of disengaging or engaging the first engagement portion 201 and the second engagement portion 202. The rotating portion 203 is sleeved over the front body 101, the front end 115 of the front body 101 is fixed with a fixing sleeve 305, a surface of the fixing sleeve 305 facing a rear end 116 of the front body 101 is provided with a first arc protrusion 306, and a second arc protrusion 307 matching the first arc protrusion 306 is provided on an inner wall of an axial hole of the rotating portion 203, so as to limit the rotation angle of the rotating portion 203, that is, making the rotation angle of the rotating portion 203 within a set range. The fixing sleeve 305 and the front end 115 of the front body 101 may be fixedly connected to each other by means of an interference fit or screws 111, and the fixing sleeve 305 may also be used to prevent the rotating portion 203 from leaving the front end 115 of the front body 101. When the rotating portion 203 rotates a certain rotation angle in the first direction, one end of the second arc protrusion 307 is stopped by one end of the first arc protrusion 306; when the rotating portion 203 rotates a certain rotation angle in the second direction, the other end of the second arc protrusion 307 is stopped by the other end of the first arc protrusion 306. The rear end 116 of the rear body 100 passes through the first engagement portion 201, and the rear body 100 and the first engagement portion are arranged with a gap therebetween, so as to ensure that the rear body 100 can rotate relative to the first engagement portion 201; the rear body 100 has a shaft shoulder 224 configured in such a manner that the rear body 100 will not leave the front body 101 after the rear end 116 of the rear body 100 passes through the first engagement portion 201.

For example, the drill chuck may be a self-tightening drill chuck, and the self-tightening drill chuck may be a gear self-tightening drill chuck, a flat jaw self-tightening drill chuck or an internal thread self-tightening drill chuck. When the first engagement portion 201 and the second engagement portion 202 are disengaged from each other, the forward rotation of the rear body 100 may realize the clamping of the drilling tool by the clamping jaws 102, and the reverse rotation of the rear body 100 may realize the loosening of the drilling tool from the clamping jaws 102. It should be noted that in this embodiment, the structure in which the rear body 100 of the self-tightening drill chuck drives the clamping jaw 102 to move and the installation of the clamping jaws 102 on the front body 101 are prior art, and are not described in detail in this embodiment.

An embodiment of the present disclosure provides a power tool, which includes a driving shaft and a drill chuck, and the drill chuck may be the drill chuck provided in the above embodiments; and the driving shaft is connected to the rear body 100 for driving the rear body 100 to rotate. The rear body 100 also has an axial threaded hole or a tapered hole for connection with the driving shaft.

Finally, it should be indicated that the various embodiments above are merely used for illustrating the technical solutions of the present disclosure, rather than limiting the present disclosure. While the detailed description is made to the present disclosure with reference to the various preceding embodiments, those ordinarily skilled in the art should understand that they still could modify the technical solutions recited in the various preceding embodiments, or make equivalent substitutions to some or all of the technical features therein. These modifications or substitutions do not make the essence of the corresponding technical solutions depart from the scope of the technical solutions of the various embodiments of the present disclosure. In the description provided herein, numerous specific details are described.

INDUSTRIAL APPLICABILITY

The clutch device, the drill chuck, the power tool, and the bidirectional rotation method of the drill chuck provided in the present disclosure advantageously ensure the drilling tool on the drill chuck to have mounting stability, avoid the occurrence of loosening or detachment, and also realize the bidirectional rotation of the drill chuck, so as to drive the drilling tool to perform bidirectional operation, and may allow more reliable, easy, simple, and convenient replacement of the drilling tool.

What is claimed is:

1. A clutch device, comprising
a return elastic member,
a transmission assembly,
a rotating portion, and
a trigger,
wherein the transmission assembly comprises a first engagement portion and a second engagement portion which are oppositely arranged; one of the first engagement portion and the second engagement portion is configured to be rotatable in synchronization with a front body of a drill clutch; and the other one of the first engagement portion and the second engagement portion is configured to be rotatable in synchronization with a rear body of the drill clutch; an engagement between the first engagement portion and the second engagement portion enables the front body and the rear body to rotate in synchronization with each other;
wherein rotation of the rotating portion enables the trigger to push the one of the first engagement portion and the second engagement portion to move so as to make the return elastic member compressed or return to an initial position, rotation of the rotating portion in a first direction enables the return elastic member to be compressed, so as to make the first engagement portion and the second engagement portions disengaged from each other; and rotation of the rotating portion in a second direction enables the compressed return elastic member to return to the initial position so as to make the first engagement portion and the second engagement portion engaged with each other;
wherein the trigger comprises levers and rotation of the rotating portion in the first direction enables the levers to pry the second engagement portion so as to make the second engagement portion move along the axial direction of the rear body such that the first engagement portion move along the axial direction of the rear body such that the first engagement portion and the second engagement portion are disengaged from each other;
wherein the trigger comprises a plurality of connecting rods fixed on the rotating portion and extending along an axial direction of the rotating portion, each connecting rod having a contact and a side surface exposed to an outside of the rotating portion; and
wherein the levers are separated and disconnected from each other, each lever having a first raised portion and a second raised portion connected to the first raised portion, where the first raised portion and the second raised portion are arranged with an angle therebetween.

2. The clutch device according to claim 1, wherein the engagement or the disengagement of the two engagement portions is realized through a tooth structure, the engagement portions are of a sheet structure, the tooth structure comprises a plurality of teeth provided on a sheet surface of the sheet structure, and the plurality of teeth are distributed in a circular shape on the sheet surface.

3. The clutch device according to claim 2, wherein the clutch device further comprises a rear sleeve, the rear sleeve is configured for being fixed connected with the rear body, and a manner for connection between the rear sleeve and the rear body is interference fit or key connection.

4. The clutch device according to claim 2, further comprising the trigger, wherein rotation of the rotating portion enables the trigger to push one of the engagement portions to move so as to make the return elastic member compressed or return to the initial position.

5. The clutch device according to claim 1, wherein the clutch device further comprises a rear sleeve, the rear sleeve is configured for being fixed connected with the rear body, and a manner for connection between the rear sleeve and the rear body is interference fit or key connection.

6. The clutch device according to claim 1, wherein the return elastic member is located outside one of the first engagement portion and the second engagement portion, and inner sides of the first engagement portion and the second engagement portion are opposite to each other.

7. The clutch device according to claim 1, wherein the return elastic member is located outside the second engagement portion, and the second engagement portion is located between the return elastic member and the first engagement portion; alternatively, the return elastic member is located outside the first engagement portion, and the first engagement portion is located between the return elastic member and the second engagement portion.

8. The clutch device according to claim 7, wherein when the return elastic member is located outside the second engagement portion, the first engagement portion is fixedly connected with the front body, and the second engagement portion is movable along an axial direction of the rear body.

* * * * *